(12) United States Patent
Gorbachov et al.

(10) Patent No.: US 8,417,286 B2
(45) Date of Patent: Apr. 9, 2013

(54) TRANSMIT-RECEIVE RADIO FREQUENCY FRONT END INTEGRATED CIRCUITS FOR LAPTOP COMPUTER APPLICATIONS

(75) Inventors: Oleksandr Gorbachov, Irvine, CA (US); Ping Peng, Irvine, CA (US)

(73) Assignee: RFaxis, Inc., Irvine, CA (US)

( * ) Notice: Subject to any disclaimer, the term of this patent is extended or adjusted under 35 U.S.C. 154(b) by 318 days.

(21) Appl. No.: 12/986,091

(22) Filed: Jan. 6, 2011

(65) Prior Publication Data

US 2011/0165848 A1 Jul. 7, 2011

Related U.S. Application Data

(60) Provisional application No. 61/292,790, filed on Jan. 6, 2010.

(51) Int. Cl.
*H04M 1/00* (2006.01)
(52) U.S. Cl. ............ 455/553.1; 455/552.1; 455/78; 455/73; 455/90.3
(58) Field of Classification Search ............ 455/73, 455/78, 553.1, 552.1, 550.1, 90.3
See application file for complete search history.

(56) References Cited

U.S. PATENT DOCUMENTS

| | | | | |
|---|---|---|---|---|
| 5,798,673 | A * | 8/1998 | Griffith et al. ............ | 330/255 |
| 5,872,489 | A * | 2/1999 | Chang et al. ............ | 331/179 |
| 6,108,313 | A | 8/2000 | Lee et al. | |
| 6,977,552 | B2 | 12/2005 | Macedo | |
| 7,187,331 | B2 * | 3/2007 | Chen et al. ............ | 343/702 |
| 7,190,974 | B2 * | 3/2007 | Efland et al. ............ | 455/562.1 |
| 7,283,800 | B2 * | 10/2007 | Li ............ | 455/323 |
| 7,315,730 | B2 | 1/2008 | Galan | |
| 7,526,266 | B2 * | 4/2009 | Al-Mahdawi ............ | 455/296 |
| 2004/0077316 | A1 * | 4/2004 | Xiong ............ | 455/78 |
| 2004/0204037 | A1 * | 10/2004 | He et al. ............ | 455/553.1 |
| 2007/0232241 | A1 | 10/2007 | Carley et al. | |
| 2008/0089252 | A1 | 4/2008 | Choi | |
| 2008/0197923 | A1 * | 8/2008 | Nakajima et al. ............ | 330/124 R |
| 2008/0279262 | A1 | 11/2008 | Shanjani | |
| 2009/0036065 | A1 | 2/2009 | Siu | |
| 2009/0117938 | A1 * | 5/2009 | Georgantas et al. ............ | 455/552.1 |

FOREIGN PATENT DOCUMENTS

WO 2008/026972 3/2008

OTHER PUBLICATIONS

SiGe PA Enables Smallest System Footprint for Embedded WLAN; Semiconductor Online; Dec. 15, 2008; 3 pages.
WLAN & WiMAX from Sirenza: Sirenza Microdevices SZA Series Linear PAs for WiFi / WiBRO / WiMAX; 14 pages.

(Continued)

*Primary Examiner* — Lewis West
(74) *Attorney, Agent, or Firm* — Stetina Brunda Garred & Brucker

(57) ABSTRACT

A radio frequency communications system with a first operating frequency band and a second operating frequency band is disclosed. There is a first antenna. A transceiver has a first transmission port, a second transmission port, a first reception port, and a second reception port. In a first front end circuit, a first port is coupled to the antenna, and a second port is coupled to the transceiver. The first front end circuit has a first low noise amplifier, a second low noise amplifier, a first power amplifier, and a second power amplifier. A switching circuit connects the first transmission port, the first reception port, the second transmission port, and the second reception port to the second port of the first front end circuit. The antenna is distant from the transceiver, while the first front end circuit is proximal to the antenna. The first switching circuit is proximal to the transceiver.

45 Claims, 17 Drawing Sheets

OTHER PUBLICATIONS

Skyworks: SKY65336: 2.4 GHz Transmit/Receive Front-End Module with Integrated LNA; Skyworks Solutions, Inc.; Aug. 20, 2008; 2 pages.
Skyworks; SKY65337: 2.4 GHz Transmit/Receive Front-End Module; Skyworks Solutions, Inc.; Aug. 20, 2008; 2 pages.
Skyworks; SKY65241-12: WLAN 802.11a, b, g, n Dual-Band Intera Front-End Module Single Antenna; Skyworks Solutions, Inc.; Mar. 12, 2008; 9 pages.
Skyworks; SKY65243-11: WLAN 802.11a, b, g, n Dual-Band Intera Front-End Module Dual Antennas; Skyworks Solutions, Inc.; Mar. 12, 2008; 8 pages.
Skyworks; SKY65256-11: WLAN 802.11a, b, g, n Dual-Band Front-End Module Single Antenna; Skyworks Solutions, Inc.; Sep. 28, 2007; 10 pages.
Skyworks; SKY65228-11: WLAN 802.11n Single Band 4.9-5.85 GHz MIMO Intera Front-End Module; Skyworks Solutions, Inc.; Oct. 9, 2007; 9 pages.
Skyworks; SKY65206-13: WLAN 802.11b/g Intera Front-End Module; Skyworks Solutions, Inc.; Aug. 21, 2007; 7 pages.
Skyworks; SKY65249-11: WLAN 802.11b, g, n. Intera Front-End Module; Skyworks Solutions, Inc.; Nov. 30, 2007; 9 pages.
Skyworks; SKY65227-11: WLAN 802.11n Single Band Intera 2.4 GHz Mimo Intera Front-End Module; Skyworks Solutions, Inc.; Oct. 9, 2007; 9 pages.
Skyworks; SKY65230-11: WLAN 802.11 n 2×2 MIMO Intera Front-End Module with 3 Antenna Ports; Skyworks Solutions, Inc.; Oct. 9, 2007; 13 pages.
Skyworks; SKY65225-11: WLAN 802.11n 2×2 MIMO Intera Front-End Module; Skyworks Solutions, Inc.; May 7, 2007; 11 pages.
Skyworks; SKY65135: WLAN Power Amplifier; Skyworks Solutions, Inc.; Mar. 26, 2007; 13 pages.
Skyworks; SKY65209: WLAN 802.11b/g Front-End Module ; Skyworks Solutions, Inc.; Jan. 18, 2006; 8 pages.
4.9-5.8 GHz High-Linearity Power Amplifier SST11LP11; SST Communications Corp; 2005, 14 pages.
4.9-5.8 GHz High-Linearity Power Amplifier SST11LP12; SST Communications Corp; 2005, 14 pages.
2.4 GHz Power Amplifier SST12LP00; SST Communications Corp; 2005, 9 pages.
2.4 GHz High-Linearity Power Amplifier SST12LP10; SST Communications Corp; 2005, 12 pages.
2.4 GHz Power Amplifier SST12LP14; SST Communications Corp; 2005, 12 pages.
2.4 GHz High-Power, High-Gain Amplifier SST12LP15; SST Communications Corp; 2005, 12 pages.
2.4 GHz High-Power, High-Gain Amplifier SST12LP15A; SST Communications Corp; 2005, 12 pages.
STLC2500C: Bluetooth EDR Single Chip Data Brief; STMicroelectronics; Jan. 2006, 4 pages.
STLC4550: Single Chip 802.11b/g WLAN radio Data Brief; STMicroelectronics; Feb. 2006, 5 pages.
ZigBee—compliant wireless control and sensoring network solutions; STMicroelectronics; Jun. 2006; 8 pages.
Texas Instruments: CC2591; 2.4-GHz RF Front End, data sheet, Jun. 2008, Texas Instruments, Inc. 18 pages.
Texas Instruments: CC2436; High-Power Dual-Band (2.4-GHz and 4.9-GHz to 5.9-GHz) RF Front End, data sheet, May 2007; Texas Instruments, Inc. 15 pages.
Texas Instruments: Technology for Innovators: WiLink 4.0 single-chip mobile WLAN solutons Product Bulletin; 2006 Texas Instruments Inc., 2 pages.
Chipcon Products from Texas Instruments: CC2420; 2.4 GHz IEEE 802.15.4 / ZigBee-ready RF Transceiver; 2008, Texas Instruments Inc., 89 pages.
Chipcon Products from Texas Instruments: CC2430; A True System-on-Chip solution for 2.4 GHz IEEE 802.15.4 / ZigBee; 2007, Texas Instruments Inc., 212 pages.
Texas Instruments: CC2520 Datasheet; 2.4 GHz IEEE 802.15.4/ SIZBEE RF Transceiver; Dec. 2007; Texas Instruments Inc.; 2007; 128 pages.
Zheng, Shaoyong, et al.; Distributed Power Amplifier/Feedback Low Noise Amplifier Switch-Less Front-End; Dept. Electronic Engineering, City University of Hong Kong, Feb. 8, 2006, p. 1659-1662.
Masse, Cecile; Analog/RF Front End; A direct-conversion transmitter for WiMAX and WiBro applications; www.rfdesign.com ; Jan. 2006, 3 pages.
XBEE OEM RF Modules; ZigBee / 802.15.4 OEM RF Modules by MaxStream, Inc. Specifications; MaxStream, Inc., 2005, 2 pages.
RFMD: Mobile Computing: Front End Module Portfolio; rfmd.com; 2009, 2 pages.
Maxim: Application Note 686; QPSK Modulation Demystified; May 1, 2002, 7 pages.
WLAN WiMAX PA & FEM Market, Feb. 12, 2009; 158 page presentation.
Cirronet ZigBee High Power Module ZMN2405HP; Oct. 28, 2007; 6 pages.
Cirronet ZigBee High Power Module ZMN2430HP; Oct. 28, 2007; 6 pages.
Cirronet ZigBee Matching RF power performance to ZigBee apps—Electronic Products; 4 pages; http://www2.electronicproducts.com/PrintArticle.aspx?ArticleURL=cirronet.feb2006.html.
Design of a Dual Band Wireless LAN SiGe-Bipolar Power Amplifier; from Sep. 2004 High Frequency Electronics; 8 pages.
EPCOS WLAN Modules Preliminary Datasheet R041_M01; Jun. 20, 2006; 14 pages.
Ember Datasheet; EM2420 2.4 GHz IEEE 802.15.4 / ZigBee RF Transceiver; Copyright 2003, 2004 by Ember Corporation; 89 pages.
Free2Move Class 1 Bluetooth Module—F2M03C1 Datasheet; Rev. Sep. 13, 2005; 46 pages.
Freescale Semiconductor Technical Data Document No. MC13191/D; Rev. 1.2 Apr. 2005; MC13191: 2.4 GHz ISM Band Low Power Transceiver; 24 pages.
Freescale Semiconductor Technical Data Document No. MC13192; Rev. 3.2 May 2007; MC13192: 2.4 GHz Low Power Transceiver for the IEEE 802.15.4 Standard; 24 pages.
Freescale Semiconductor; MC13191: 2.4 GHz Low Power Transceiver for the IEEE 802.15.4 Standard; Reference Manual; Document No. MC13191RM; Rev. 1.2; Apr. 2005; 92 pages.
Freescale Semiconductor Technical Data; Document No. MC13192; Rev. 2.8, Apr. 2005; MC13192/MC13193: 2.4 GHz Low Power Transceiver for the IEEE 802.15.4 Standard; 23 pages.
Freescale Semiconductor MC13192/MC13193: 2.4 GHz Low Power Transceiver for the IEEE 802.15.4 Standard; Reference Manual; Rev. 1.3 Apr. 2005; 111 pages.
California Eastern Laboratories: FreeStar ZFSM-100 Series ZigBee-Ready Modules; May 2008; 1 page.
CEL Preliminary Data Sheet; Apex & Apex LT Series Transceiver Modules; ZAXM-201-1, ZALM-301-1; May 7, 2008; 17 pages.
CEL Preliminary Data Sheet; Freestar Series Transceiver Module; ZFSM-101-1; May 7, 2008; 10 pages.
CEL Preliminary Data Sheet; Matrix Transceiver Modules; ZMXM-400 Series; May 7, 2008; 12.
J. Trachewsky, et al.; Broadcom WLAN Chipset for 802.11a/b/g; Broadcom Corporation, CA, USA; Aug. 17, 2003; 42 pages.
Anadigics; AWL6254; 1.4 GHz 802.11b/g/n; WLAN PA, LNA, and RF Switch Data Sheet—Rev 2.0; Feb. 2008; 16 pages.
Anadigics; AWM6430; 3.3-3.6 GHz Power Amplifier Module; Preliminary Data Sheet; Rev 1.0; Jan. 2006; 12 pages.
Zhang, Weimin; A Low Voltage Fully-Integrated 0.18um CMOS Power Amplifier for 5GHz WLAN; Institute of Microelectronics, Singapore; 2002; 4 pages.
Copeland, Miles A.; 5-GHz SiGe HBT Monolithic Radio Transceiver with Tunable Filtering; IEEE Transactions on Microwave Theory and Techniques, vol. 48 No. 2, Feb. 1000, 12 pages.
Atheros AR3011—ROCm Solutions for Bluetooth; Radio-On-Chip for Mobile (ROCm) Products; Jan. 22, 2008; 2 pages.
Atheros AR3000—ROCm Solutions for Bluetooth Radio-On-Chip for Mobile (ROCm) Products; Jan. 22, 2008; AR3031; 2 pages.
Atheros ROCm Platform; Radio-On-Chip for Mobile (ROCm; AR6001GL; Embedded 802.11b/g Solution for Mobile and Battery-Operated Devices; 2006; 2 pages.
AR6002 Breaking the Power Barrier in Mobile WiFi; Aug. 28, 2008; 2 pages.

AR6001GL; Embedded 802.11b/g Solution for Mobile and Battery-Operated Devices; 2006; 2 pages.
AR6001XL; Embedded 802.11a/b/g Solution for Mobile and Battery-Operated Devices; 2006; 2 pages.
AR6101G; World's Most Integrated, Cost-Effective Single-Chip WLAN Handset Design Brings Voice-Over-WiFi to the Mainstream; 2006; 2 pages.
AR9285 Single-chip PCIe based on 802.11n 1-stream specification; Oct. 28, 2008; 2 pages.
AR9002AP-1S; AP/Router solution based on 802.11n 1-stream specification; Oct. 28, 2008; 2 pages.
How MLO Works the Power of Passive Components; JMD RF Made Simple: Jacket Micro Devices: Modules; copyright 2006 Jacket Micro Devices, Inc., 2 pages.
Atmel: Bluetooth Front-end IC T7024 Design Guide; Jun. 2004; 18 pages.
Atmel: Integrated SiGe Front-end RF ICs;2003, 2 pages.
Atmel: 5-GHz WLAN Power Amplifier for 802.11a, ATR3515 Preliminary; 2004, 7 pages.
Atmel: High Gain Power Amplifier for 802.11b/g WLAN Systems, ATR7032 Preliminary; 2006, 15 pages.
Atmel: ZigBee IEEE 802.15.4 Radio Transceiver; AT86RF230, Preliminary; 2007, 82 pages.
Anadigics: AWM6430; 3.5 GHz WiMAX Power Amplifier Module, Advanced Product Information—Rev. 0.1; Jan. 2005; 12 pages.
Broadcom; BCM4328 Product Brief; Air Force One Single-Chip IEEE 802.11a/b/g MAC/Baseband/Radio With Integrated CPU; Dec. 5, 2006; 2 pages.
Broadcom; BCM4326 Product Brief; Air Force One Single-Chip IEEE 802.11b/g MAC/Baseband/Radio With Integrated CPU; Dec. 5, 2006; 2 pages.
Broadcom: BCM94318 Product Brief: Airforce One Chip 802.11 Reference Design; Oct. 7, 2004; 2 pages.
Xin He, Fully Integrated Transceiver Design in SOI Processes, a Dissertation, Kansas State University, 2004, 129 pages.
Maxim: Industry's First Ultra-Low-Power, 802.11g/b RF Transceiver to Integrate PA, Rx/Tx/Antenna Diversity Switches, and Crystal Oscillator Circuitry; Apr. 30, 2008; 2 pages.
Maxim: MAX2830 Industry's First802.11G/B RF Transceiver with Integrated PA, Rx/Tx and Antenna Switches; Apr. 30, 2008; 3 pages.
Meshnetics: ZigBit Amp OEM Modules; ZDM-A1281-PN/PNO (MNZG-A24-UFL/UO) Revision 2.2; Ultra-Compact 2.4GHz 802.15.4/ZigBee Modules with Power Amplifier for Wireless Networking Applications; Oct. 2008, 18 pages.
Meshnetics: ZigBit Amp OEM Modules ZDM-A1281-PN/PNO Revision 2.1; Ultra-Compact 2.4GHz 802.15.4/ZigBee Modules with Power Amplifier for Wireless Networking Applications; Dec. 2007, 15 pages.
Murata MF2400PJ-SF0702; PA MMIC for 2.4GHz Wireless Communication; Jan. 18, 2003; 11 pages.
CEL; GaAs Integrated Circuit PG2250T5N; 1.8 V, Power Amplifier for Bluetooth Class 1; NEC Electronics Corp.; 2006, 12 pages.
CEL NEC's Power Amplifier for Bluetooth Class 1: UPG2301TQ Data Sheet; Feb. 4, 2004; 7 pages.
CEL: GaAs HBT Integrated Circuit PG2314T5N: Power Amplifier for Bluetooth Class 1; Jul. 2006, 10 pages.
CEL Application Note: AN1048 UPG2150T5L Switch; Sep. 29, 2005, 1 page.
CEL California Eastern Laboratories: AN1049 UPG2314T5N HBT PA IC for Bluetooth and ZigBee; Oct. 17 2006; 5 pages.
RT2501 Wireless Chipset 802.11 b/g solution featuring Packet-Overdirve Technology; Ralink Technology Corp; 2006, 1 page.
RT2501U; USB2.0 Wireless Chipset 802.11 b/g solution featuring Packet-Overdirve Technology; Ralink Technology Corp., 2006, 1 page.
RT2600 MIMO XR Wirless Chipset 802.11b/g solution featuring Packet-Overdrive and Range-Overdirve Technologies; Ralink Technology Corp; 2006, 1 page.
RT2700 MIMO Wireless Chipset Family; 802.11n Solution featuring MIMObility Technology; Ralink Technology Corp; 2006, 2 pages.
RT2800 MIMO Wireless Chipset Family 802.11n Solution featuring MIMObility Technology; Ralink Technology Corp; 2006, 2 pages.
RT5201 Wireless Chipset 802.11 a/b/g solution featuring Packet-Overdirve Technology; Ralink Technology Corp; 2006, 1 page.
RT5201U USB 2.0 Wireless Chipset 802.11 a/b/g solution featuring Packet-Overdirve Technology; Ralink Technology Corp; 2006, 1 page.
RT5600 MIMO XR Wireless Chipset 802.11 a/b/g solution featuring Packet-Overdirve and Range-Overdirve Technologies; Ralink Technology Corp; 2006, 1 page.
Agnelli, Federico, et al; Wireless Multi-Standard Terminals: System Analysis and Design of a Reconfigurable RF Front-end; IEEE Circuits and Systems Magazine; First Quarter 2006; p. 38-59.
Cutler, Tim; ZigBee: RF power options in ZigBee solutions; Emerging Wireless Technology/A Supplement to RF Design; www.rfdesign.com; Mar. 2006; p. 18-21.
RFMD SiW1722B: Bluetooth Transceiver Solution for CDMA and WCDMA Mobile Phones; rfmd.com; Oct. 2006; 2 pages.
Richwave RTC6682 VO.3 Data Sheet Aug. 2006; www.richwave.com.tw; 7 pages.

* cited by examiner

| FIG. 9B |
| FIG. 9A |

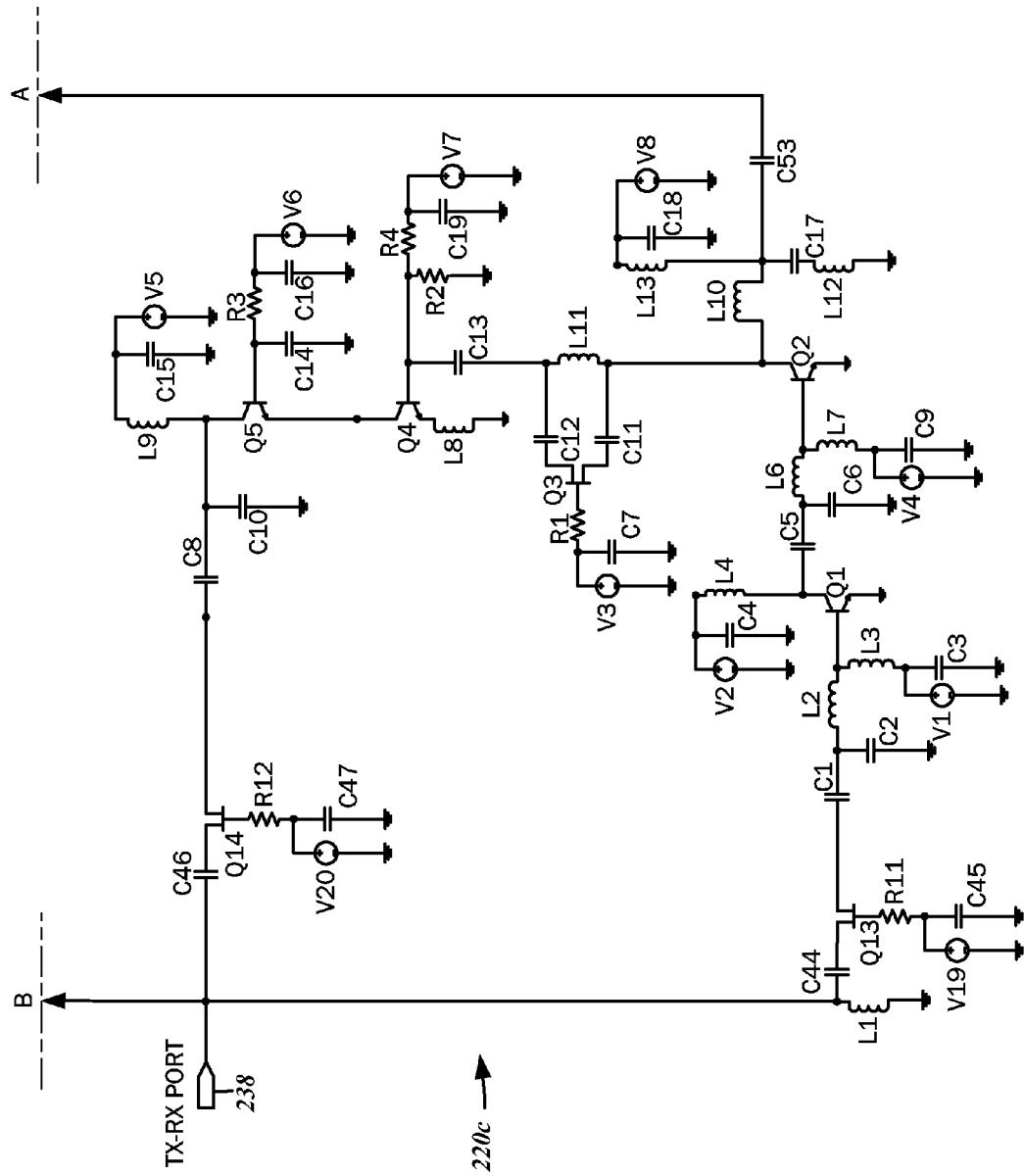
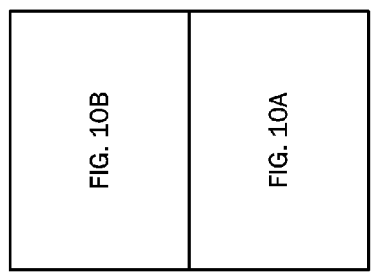
*FIG. 10A*
*FIG. 10*

TRANSMIT-RECEIVE RADIO FREQUENCY FRONT END INTEGRATED CIRCUITS FOR LAPTOP COMPUTER APPLICATIONS

CROSS-REFERENCE TO RELATED APPLICATIONS

This application relates to and claims the benefit of U.S. Provisional Application No. 61/292,790, filed Jan. 6, 2010 and entitled TRANSMIT-RECEIVE RF FRONT-END INTEGRATED CIRCUITS FOR LAPTOP APPLICATIONS, which is wholly incorporated by reference herein.

STATEMENT RE: FEDERALLY SPONSORED RESEARCH/DEVELOPMENT

Not Applicable

BACKGROUND

1. Technical Field

The present invention relates generally to radio frequency (RF) signal communications systems and circuitry, and more particularly, to transmit-receive RF front end integrated circuits for laptop computer applications.

2. Related Art

Wireless communications systems find application in numerous contexts involving information transfer over long and short distances alike, and there exists a wide range of modalities suited to meet the particular needs of each. Generally, wireless communications involve a radio frequency (RF) carrier signal that is variously modulated to represent data, and the modulation, transmission, receipt, and demodulation of the signal conform to a set of standards for coordination of the same. For wireless computer data networks, such standards include Wireless LAN (IEEE 802.11x), which is understood to be a time domain duplex system where a bi-directional link is emulated on a time-divided communications channel. Wireless LAN allows several computer systems within a local area to connect to an access point, which provides a link to the global Internet network. Due to the proliferation of mobile computing devices such as laptop computers, Wireless LAN networks may be found in a variety of public locations, including airports, cafes, and the like.

As is fundamental to any wireless communication system, laptop computers have a network interface card with a transceiver, that is, the combined transmitter and receiver circuitry, to enable Wireless LAN connectivity. The transceiver, with its digital baseband subsystem, encodes the digital data to a baseband signal and modulates the baseband signal with an RF carrier signal. Upon receipt, the transceiver down-converts the RF signal, demodulates the baseband signal, and decodes the digital data represented by the baseband signal. An antenna connected to the transceiver converts the electrical signal to electromagnetic waves, and vice versa.

For improving performance of Wireless LAN networks, particularly in relation to increased data throughput and extended link range without additional bandwidth or transmit power, several enhancements over conventional single operating frequency and single transmission/reception schemes have been contemplated. One is the multiple input-multiple output (MIMO) system architecture. Higher spectral efficiency and link reliability is achieved by splitting a high data rate signal into several lower data rate signals, and transmitting each such lower data rate signal via separate antennas. The receiver end also has multiple antennas for receiving such separated signals, which are combined to a single data stream.

The latest IEEE Wireless LAN standard, 802.11n, employs an operating frequency on both the 2.4 GHz band, as well as the 5 GHz band. Furthermore, this standard also adds the aforementioned MIMO architectures. Thus, recent Wireless LAN enabled laptop computers are typically configured with a pair of antennas that are mounted on the inside of the cover. In most cases, the transceiver integrated circuit itself does not generate sufficient power or have sufficient sensitivity necessary for reliable communications. Thus, additional circuits referred to as a front end is utilized between the transceiver and the antenna. Generally, the front end circuit includes a power amplifier for boosting transmission power, and/or a low noise amplifier to increase receive sensitivity. Due to the differing operational parameters and tuning requirements for the 2.4 GHz band and the 5 GHz band, there are separate power amplifiers and low noise amplifiers for each.

The typical architecture for Wireless LAN network interface cards is comprised of a 5 GHz signal transmit line, a 2.4 GHz signal transmission line, a first 5 GHz signal receive line, a second 5 GHz signal receive line, a first 2.4 GHz signal receive line, and a second 2.4 GHz signal receive line, which are variously, selectively connected to a first antenna and a second antenna. In the front end circuit, the 5 GHz signal transmit line may be connected to a band pass filter and a power amplifier tuned therefor, and followed by a harmonics filter. Additionally, the 2 GHz signal transmit line may be similarly connected to a band pass filter and a power amplifier tuned therefor, and also followed by a harmonics filter. The outputs for the two different signal frequency harmonics filters are connected to a diplexer (L, H terminals), with the S terminal being connected to one terminal in a single pole, double throw switch. The other throw terminal thereof may be connected to an input of a dual band low noise amplifier, the output of which is connected to a diplexer. One of the terminals of the diplexer is connected to the 5 GHz signal receive line, and the other is connected to the 2.4 GHz signal receive line. The pole of the switch may be connected to a first one of the antennas, thus switching between the transmit and first receive lines of both the 5 GHz signal and the 2.4 GHz signal. The second antenna may be connected to a dual band low noise amplifier, the output of which is connected to another diplexer. One of the terminals of the diplexer is connected to the second 5 GHz signal receive line, while the other is connected to the second 2.4 GHz signal receive line.

The Wireless LAN network interface card is typically located on the main board of the laptop computer, and away from the antennas that are mounted on the clamshell cover. Thus, the foregoing implementations suffer from increased noise figures because of the long cable traces necessary. The losses attributable to the cable are typically around 2 dB. Additionally, the diplexers have an associated loss of around 0.5 dB to 0.7 dB, and the single pole, double throw switch likewise has an associated loss of around 0.5 dB to 0.7 dB. Accordingly, there is a need in the art for transmit-receive RF front end integrated circuits for laptop computer applications that reduce the receive chain noise figure, while minimizing current draw during signal transmission.

BRIEF SUMMARY

In accordance with one embodiment of the present disclosure, a radio frequency (RF) communications system with a first operating frequency band and a second operating frequency band is contemplated. There may be a first antenna and a second antenna, as well as a transceiver with a first operating frequency band transmission port, a second operating frequency band transmission port, a first operating frequency band primary reception port, a second operating frequency band secondary reception port, a second operating frequency band primary reception port, and a second operating frequency band secondary reception port. The system may include a first front end circuit with a first operating frequency band low noise amplifier, a second operating frequency band low noise amplifier, and a first operating frequency band power amplifier. This first front end circuit may be connected to the first antenna. Additionally, there may be a second front end circuit including a first operating frequency band low noise amplifier, a second operating frequency band low noise amplifier, and a second operating frequency band power amplifier. This second front end circuit may be connected to the second antenna. The system may further include a first switching circuit that selectively connects the first operating frequency band transmission port, the first operating frequency band primary reception port, and the second operating frequency band secondary reception port to the first front end circuit. Similarly, there may be a second switching circuit that selectively connects the second operating frequency band transmission port, the first operating frequency band secondary reception port, and the second operating frequency band primary reception port to the second front end circuit. The first antenna and the second antenna may be distant from the transceiver, while the first and second front end circuit may be proximal to the respective one of the first and second antenna. The first and second switching circuits may be proximal to the transceiver.

According to another embodiment, there is disclosed an RF communications system that has a first operating frequency band and a second operating frequency band. The system may have a first antenna and a second antenna, as well as a transceiver with a first operating frequency band primary transmission port, a second operating frequency band primary transmission port, a first operating frequency band primary reception port, and a second operating frequency band primary reception port. There may also be included a first front end circuit with a first port coupled to the first antenna and a second port coupled to the transceiver. The first front end circuit may include a first operating frequency band low noise amplifier, a second operating frequency band low noise amplifier, a first operating frequency band power amplifier, and a second operating frequency band power amplifier. A first switching circuit may selectively connect the first operating frequency band primary transmission port, the first operating frequency band primary reception port, the second operating frequency band primary transmission port, and the second operating frequency band secondary reception port to the second port of the first front end circuit. The first antenna and the second antenna may be distant from the transceiver, while the first front end circuit may be proximal to the first and second antenna. The first switching circuit may be proximal to the transceiver.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIGS. 10, 10A, and 10B are schematic diagrams showing various segments of a third embodiment of the RF front end circuit with combined transmit-receive ports for both the first operating frequency band and the second operating frequency band;

Common reference numerals are used throughout the drawings and the detailed description to indicate the same elements.

DETAILED DESCRIPTION

The detailed description set forth below in connection with the appended drawings is intended as a description of the presently preferred embodiment of the invention, and is not intended to represent the only form in which the present invention may be developed or utilized. The description sets forth the functions of the invention in connection with the illustrated embodiment. It is to be understood, however, that the same or equivalent functions may be accomplished by different embodiments that are also intended to be encompassed within the scope of the invention. It is further understood that the use of relational terms such as first and second and the like are used solely to distinguish one from another entity without necessarily requiring or implying any actual such relationship or order between such entities. The present application relates to co-pending U.S. patent application Ser. No. 12/412,226 entitled "Radio Frequency Transceiver Front End Circuit" filed Mar. 26, 2009, as well as co-pending U.S. patent application Ser. No. 12/980,794 entitled "Increased Receive Sensitivity Radio Frequency Front End Circuits"

filed Dec. 29, 2010, the disclosures of which are expressly incorporated by reference herein.

Figure 1:
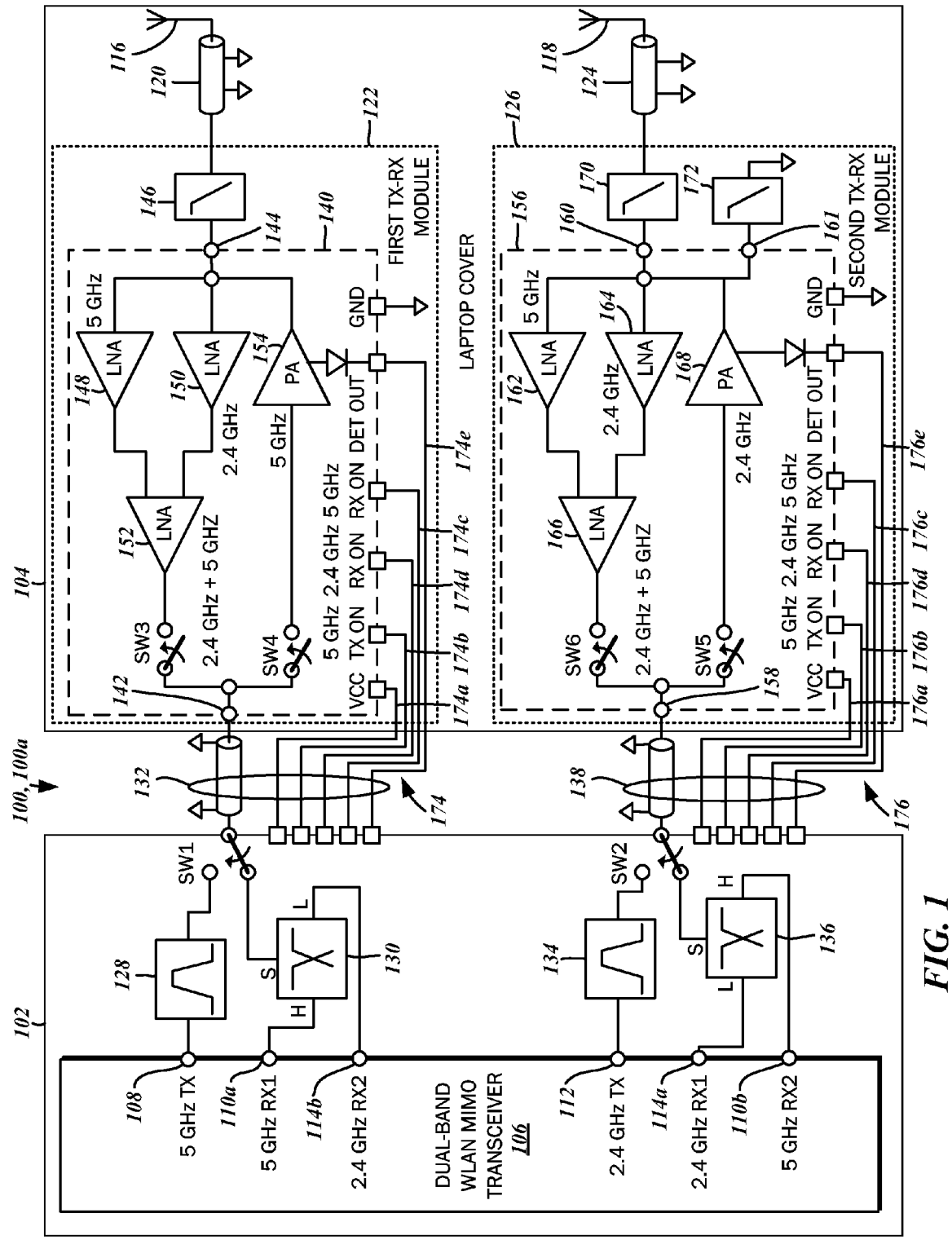
FIG. 1 is a block diagram of a first embodiment of an RF communications system utilized in a laptop computer, with a front end circuit in accordance with various aspects of the present disclosure.

The block diagram of FIG. 1 illustrates a first embodiment of an RF communications system 100a with a first operating frequency band and a second operating frequency band. By way of example, the RF communications system 100 in general is a wireless local area network (WLAN) module of a computer system, which is preferably, though optionally, a mobile device such as a laptop computer. Though specific features related to this form factor will be described, it will be recognized that the RF communications system 100 may be utilized in any computing device that incorporates wireless networking features. Various embodiments of the RF communications system 100 are understood to be compliant with the IEEE 802.11 standard, which defines an operating frequency band of 5 GHz as well as 2.4 GHz. These correspond to the respective first and second operating frequency bands.

A laptop computer typically has a flip or clamshell form factor comprised of a body with a hinged cover. The body includes the main board, along with the central processing unit, graphics card, memory, storage drives, and the like which are connected to the main board. One conventional modality by which these components are functionally linked is the peripheral component interconnect (PCI) bus. The components can be an integrated circuit that is embedded into the main board, or independent card modules that are attached to expansion slots. With laptop computers where available space is extremely limited, expansion cards may conform to a subset of the PCI standard that defines a smaller form factor, such as Mini-PCI or PCI Express Mini. Input devices such as a keyboard or a track pad may be mounted to the body as well, and connected to the main board. A display screen is mounted to the hinged cover and connected to the graphics card.

The radio frequency communications system 100 is generally comprised of a body segment 102 and a cover segment 104, the physical disposition thereof generally corresponding to the aforementioned body and cover of the laptop computer. The various components of the body segment 102 may be embedded in the main board or incorporated into an expansion card, as noted above. One such component is a multiple input, multiple output (MIMO) WLAN transceiver 106. As indicated above, the transceiver 106 is dual band with a first operating frequency band of 5 GHz and a second operating frequency band of 2.4 GHz, each having one transmit line and two receive lines. Thus, for the 5 GHz operating frequency band, the transceiver 106 has a first operating frequency band transmit port 108, a first operating frequency band primary receive port 110a, and a first operating frequency band secondary receive port 110b. For the 2.4 GHz operating frequency band, the transceiver 106 has a second operating frequency band transmit port 112, a second operating frequency band primary receive port 114a, and a second operating frequency band secondary receive port 114b.

A first antenna 116 and a second antenna 118 are mounted to the cover of the laptop computer, and thus are a part of the cover segment 104. The performance characteristics of the first antenna 116 and the second antenna 118 are understood to be substantially similar. Connected to the first antenna 116 over a first antenna cable 120 is a first transmit-receive module 122. Likewise, connected to the second antenna 118 over a second antenna cable 124 is a second transmit-receive module 126.

As described in greater detail below, the first transmit-receive module 122 amplifies a 5 GHz signal for the first antenna 116, while the second transmit-receive module amplifies a 2.4 GHz signal for the second antenna 118. Furthermore, each of the antennas 116, 118 and associated circuitry are configured to receive both a 5 GHz signal and a 2.4 GHz signal, thus enabling true MIMO reception where both operating frequency band signals are received simultaneously. Likewise, transmission of both 5 GHz signals and 2.4 GHz signals is also contemplated, with the spatial separation of the first and second antennas 116, 118 reducing interference therebetween. Alternatively, it is also possible to transmit on one operating frequency band while receiving on another. It is contemplated that together with the first transmit-receive module 122, a first switch SW1 of the body segment 102 selectively connects the first operating frequency band transmit port 108, the first operating frequency band primary receive port 110a, and the second operating frequency band secondary receive port 110b to the first antenna 116. Along these lines, a second switch SW2 of the body segment 102 selectively connects the second operating frequency band transmit port 112, the second operating frequency band primary receive port 114a, and the first operating frequency band secondary receive port 110b.

Besides the first switch SW1, the body segment 102 includes additional circuitry associated therewith. More particularly, a first operating frequency band transmit band-pass filter 128 is connected to the first operating frequency band transmit port 108. The first switch SW1 is a single pole, dual throw type RF switch with a first throw thereof being connected to the first operating frequency band transmit band-pass filter 128. The second throw of the first switch SW1 is connected to an S port of a first dual-band diplexer 130, with the L port connected to the second operating frequency band secondary receive port 114a, and the H port connected to the first operating frequency band primary receive port 110a. It is understood that a diplexer splits a composite signal from the first transmit-receive module 122 to the high frequency signal (5 GHz) and a low frequency signal (2.4 GHz), and passing the same to the respective receive ports. The single pole of the first switch SW1 is coupled to a first interconnect cable 132.

The additional circuitry associated with the second switch SW2 has a similar configuration. A second operating frequency band transmit band-pass filter 134 is connected to the second operating frequency band transmit port 112. Again, the switch SW2 is a single pole, dual throw type RF switch. The first throw thereof is connected to the second operating frequency band transmit band-pass filter 134, while the second throw is connected to an S port of a second dual-band diplexer 136. The H port is connected to the first operating frequency band secondary receive port 110b, and the L port is connected to the second operating frequency band primary receive port 114a. The pole of the second switch SW2 is coupled to a second interconnect cable 138.

The first transmit-receive module 122 and the second transmit-receive module 126 are placed in the cover of the laptop computer, thus minimizing the distance between the transmit-receive modules 122, 126 and the antennas 116, 118. In many laptop computer configurations, the first antenna 116 may be disposed on one lateral edge of the cover, while the second antenna 118 may be disposed on the opposite lateral edge of the cover to maximize the distance between the respective first antenna 116 and the second antenna 118. In this regard, each of the transmit-receive modules 122, 126 are likewise disposed on or near the lateral edges of the cover. It is contemplated that the length of the first antenna cable 120 and the second antenna cable 124 can be reduced significantly and minimizing the signal losses associated therewith. The transceiver 106, along with the associated switching and transmit band pass filters, are disposed in the body segment 102, apart from the cover segment 104.

The first transmit-receive module 122 includes a first front end circuit 140 comprised of amplification circuitry for the transmitted and received signals as well as a first operating frequency band harmonics filter 146. The first front end circuit 140 has a first port 142 coupled to the first interconnect cable 132, and a second port 144 coupled to the first operating frequency band harmonics filter 146. In further detail, the first operating frequency band harmonics filter 146 is understood to reject the second and third harmonic frequencies of the 5 GHz operating frequency band.

Generally, two stages are contemplated for amplifying the received signal on the first antenna 116. There is a first operating frequency band low noise amplifier 148 that is specifically tuned for 5 GHz signals, and a second operating frequency band low noise amplifier 150 tuned for 2.4 GHz signals. Additionally, there is a combined operating frequency band low noise amplifier 152 with two inputs that are connected to the first stages of the first operating frequency band low noise amplifier 148 and the second operating frequency band low noise amplifier 150. The output of the combined operating frequency band low noise amplifier 152 is selectively connected to the first port 142 via a third RF switch SW3.

There is a single first operating frequency band power amplifier 154 with its output connected to the second port 144, and its input connected to a fourth RF switch SW4. It is understood that the fourth switch SW4 selectively connects the first operating frequency band power amplifier 154 to the first port 142. Together with the first switch SW1, the third switch SW3 and the fourth switch SW4 can be set variously, while activating and deactivating the amplifier circuitry, to enable different transmit and receive modes.

The second transmit-receive module 126 is configured similarly to the first transmit-receive module 122 discussed above. There is a second front end circuit 156 comprised of amplification circuitry for the transmitted and received signals, has a first port 158 coupled to the second interconnect cable 138. Again, there are two stages involved with amplifying the received signal on the second antenna 118. A first operating frequency band low noise amplifier 162 is specifically tuned for 5 GHz received signals, and a second operating frequency band low noise amplifier 164 tuned for 2.4 GHz received signals. Another combined operating frequency band low noise amplifier 166 with two inputs are connected to the first stages of the first operating frequency band low noise amplifier 162 and the second operating frequency band low noise amplifier 164. The output of the combined operating frequency band low noise amplifier 166 is selectively connected to the first port 158 via a sixth RF switch SW6.

The output of a second operating frequency band power amplifier 168 is also connected to the second port 160, and its input is connected to a fifth RF switch SW5. This fifth switch SW5 selectively connects the second operating frequency band power amplifier 168 to the first port 158. Together with the second switch SW2, the fifth switch SW5 and the sixth switch SW6 can be set and reset, while activating and deactivating the amplifier circuitry, to enable different transmit and receive modes.

The second port 160 of the second front end circuit 156 is connected to a second operating frequency band third order harmonics filter 170. Additionally, the second front end circuit 156 includes a third port 161 that is connected to a second operating frequency band second order harmonics filter 172. This external configuration is contemplated to reject the second order harmonics of the 2.4 GHz operating frequency at the second antenna 118, without degrading reception performance with respect to the first operating frequency band. It will be recognized that this external harmonics filter can be implemented with the first transmit-receive module 122 above, as well.

As briefly mentioned above, the various switches and amplifier circuits of the RF communications system 100 can be selectively set/reset or activated/deactivated for different transmit and receive modes with the first operating frequency band and the second operating frequency band. From the transceiver 102 there is a first set of control and amplifier bias lines 174 (for the first transmit-receive module 122) and a second set of control and amplifier bias lines 176 (for the second transmit-receive module 126), in addition to the respective signal transmission conductors that are a part of the first interconnect cable 132 and the second interconnect cable 138. Accordingly, the front end circuits 140, 156 each have a set of input ports for such control and amplifier bias lines. For the sake of convenience, these input ports and corresponding control lines will be referenced as single elements. The two sets of control and amplifier bias lines 174, 176 are understood to allow independent control of the first front end circuit 140 and the second front end circuit 156. In further detail, there are VCC/power supply lines 174a, 176a, and first operating frequency band transmit control and amplifier bias lines 174b, 176b. Additionally, there are second operating frequency band receive control and amplifier bias lines 174c, 176c, and first operating frequency receive control and amplifier bias lines 174d, 176d. Both of the front end circuits 140, 156 have a transmit power detection feedback line 174e, 176e, respectively, which monitors the transmitted power levels for closed-loop system operation.

Based upon the foregoing configuration of the first transmit-receive module 122 and the second transmit-receive module 126, the different transmit and receive modes and the corresponding states of the switches and amplifier circuits will be described. In a first operating frequency band transmit mode, the first switch SW1 is set to connect the first operating frequency band transmit port 108 to the first interconnect cable 132. The third switch SW3 is set open, while the fourth switch SW4 is closed, connecting the first port 142 of the first front end circuit 140 to the input of the first operating frequency band power amplifier 154. The first operating frequency band low noise amplifier 148, the second operating frequency band low noise amplifier 150, and the combined operating frequency band low noise amplifier 152 are deactivated, while the first operating frequency band power amplifier 154 is activated. The amplified signal passes through the first operating frequency band harmonics filter 146 and the first antenna cable 120 to the first antenna 116. As indicated above, the second transmit-receive module 126 can independently receive signals of the 5 GHz operating frequency band at the same time.

In a second operating frequency band transmit mode, the second switch SW2 is set to connect the second operating frequency band transmit port 112 to the second interconnect cable 138. The sixth switch SW6 is set open, while the fifth switch SW5 is closed to connect the first port 158 of the second front end circuit 156 to the input of the second operating frequency band power amplifier 168. The first operating frequency band low noise amplifier 162, the second operating frequency band low noise amplifier 164, and the combined operating frequency band low noise amplifier 166 are deactivated, while the second operating frequency band power amplifier 168 is activated. The amplified signal passes through the second operating frequency band third order harmonics filter 170 and the second antenna cable 124 to the first antenna 116. The first transmit-receive module 122 can independently receive signals of the 2.4 GHz operating frequency band at the same time.

In a first operating frequency band receive mode, the first operating frequency band power amplifier 154 and the second operating frequency band low noise amplifier 150 of the first transmit-receive module 122 are deactivated, while the first operating frequency band low noise amplifier 148 and the combined operating frequency band low noise amplifier 152 are activated. The third switch SW3 is closed, and the fourth switch SW4 is open, connecting the output of the combined operating frequency band low noise amplifier 152 to the first port 142 of the first front end circuit 140. Thus, the first operating frequency signal received on the first antenna 116 is amplified and passed to the transceiver 106. Specifically, the first switch SW1 connects the pole to the throw which is connected to the S port of first dual band diplexer 130, with the 5 GHz signal being passed to the H port and the first operating frequency band primary receive port 110a.

A first operating frequency signal received on the second antenna 118 may be similarly amplified an passed to the first operating frequency band secondary receive port 110b, with an activation of the first operating frequency band low noise amplifier 162, the combined operating frequency band low noise amplifier 166, and closing the sixth switch SW6. Additionally, the second operating frequency band power amplifier 168, as well as the second operating frequency band low noise amplifier 164 may be deactivated with the fifth switch SW5 open. On the body segment 102, the second switch SW2 is set to connect the pole to the throw that is coupled to the S port of the second dual band diplexer 136, with the 5 GHz signal being passed to the first operating frequency band secondary receive port 110b.

In a second operating frequency band receive mode, the second operating frequency band power amplifier 168 and the first operating frequency band low noise amplifier 162 of the second transmit-receive module 126 are deactivated, while the second operating frequency band low noise amplifier 164 and the combined operating frequency band low noise amplifier 166 are activated. The sixth switch SW6 is closed and the fifth switch SW5 is open, connecting the output of the combined operating frequency band low noise amplifier 166 to the first port 158 of the second front end circuit 156. Thus, the second operating frequency signal received on the second antenna 118 is amplified and passed to the transceiver 106. The second switch SW2 connects the pole to the throw that is connected to the S port of the second dual band diplexer 136, with the 2.4 GHz signal being passed to the L port thereof and the second operating frequency band primary receive port 114a.

Reciprocally similar to the first operating frequency band receive mode, a second operating frequency signal received on the first antenna 116 may be similarly amplified an passed to the second operating frequency band secondary receive port 114b, with an activation of the appropriate amplifiers in the first front end circuit 140 including the second operating frequency band low noise amplifier 150 and the combined operating frequency band low noise amplifier 152. The third switch SW3 is closed. Additionally, the first operating frequency band power amplifier 154, as well as the first operating frequency band low noise amplifier 148 may be deactivated, with the fourth switch SW4 open. The second switch SW1 is set to connect the pole to the throw coupled to the S port of the first dual band diplexer 130, with the 2.4 GHz signal being passed to the L port thereof and the second operating frequency band secondary receive port 114b.

As noted above, it is also possible to activate both the first operating frequency band low noise amplifier 148 and the second operating frequency band low noise amplifier 164 in the first front end circuit 140, as well as the first operating frequency band low noise amplifier 162 and the second operating frequency band low noise amplifier 164 of the second front end circuit 156 simultaneously. In this mode, the third switch SW3 is closed, as is the sixth switch SW6, thereby connecting the output of the combined operating frequency band low noise amplifiers 152, 166, to the respective first ports 142, 158, of the first front end circuit 140 and the second front end circuit 156. The first and second dual band diplexers 130, 136 split the combined 5 GHz and 2.4 GHz signals to their constituent parts and passes the same to the H and L ports, respectively.

Figure 2:
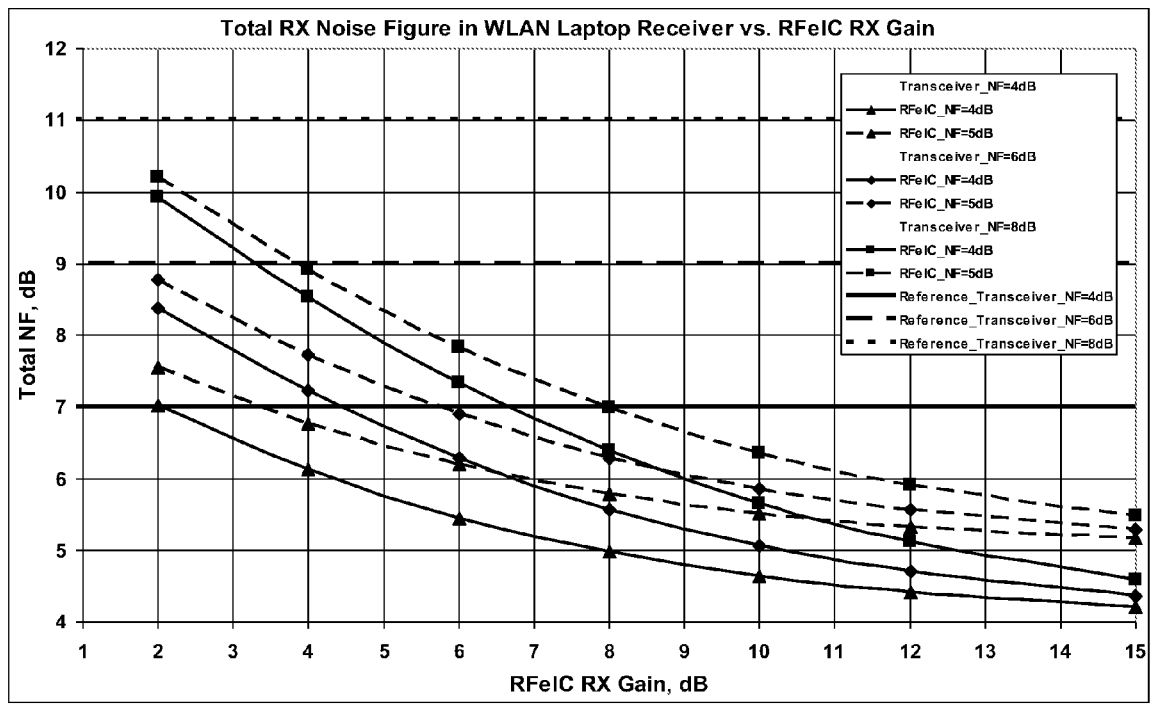
FIG. 2 is a graph illustrating the total receive noise figure in a contemplated wireless network laptop receiver utilizing the RF communications system versus receiver gain.
Figure 3:
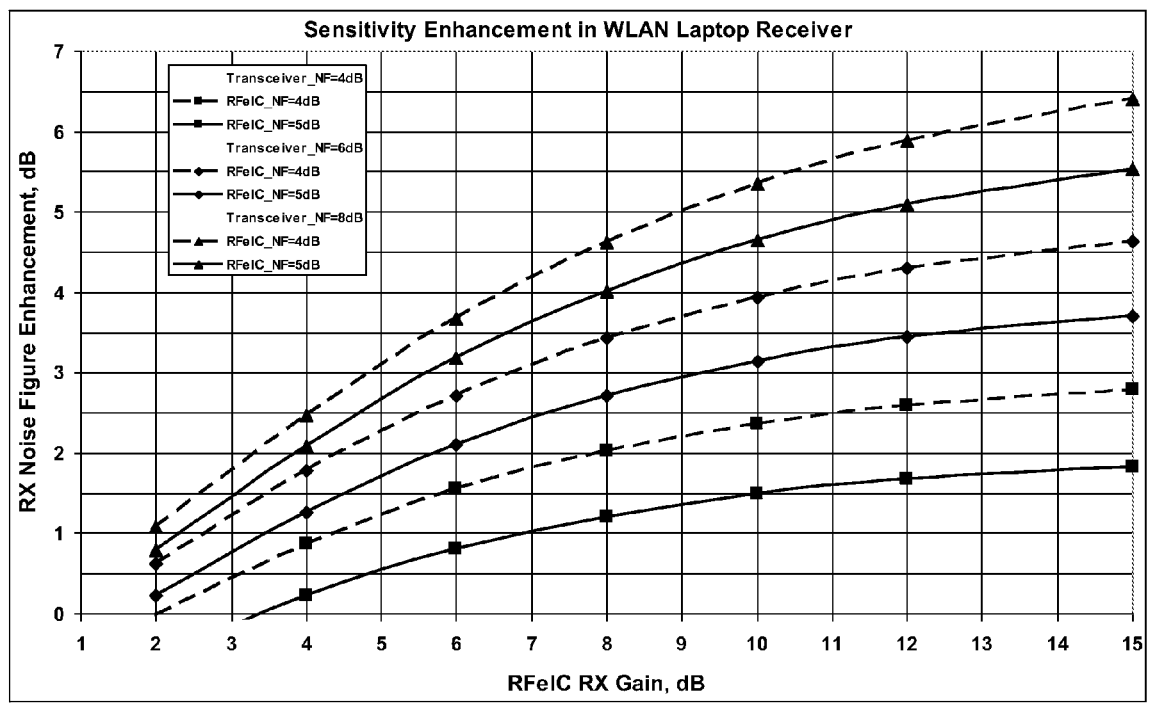
FIG. 3 is a graph illustrating the improvements in receiver sensitivity per the first embodiment of the RF communications system.
Figure 4:
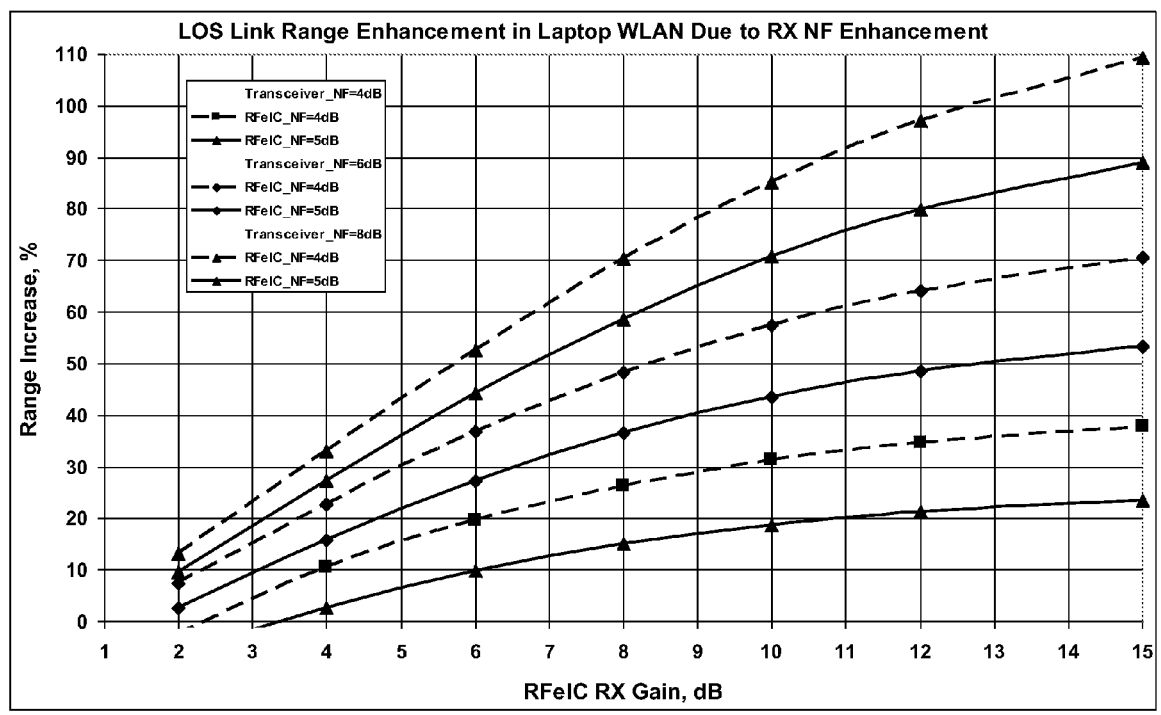
FIG. 4 is a graph illustrating the improvements in link distance possible in part to the noise figure reductions in the first embodiment of the RF communications system.

With the above configuration, substantial performance improvements may be realized. In some contemplated embodiments, current draw of the RF communications system 100 can be improved by a factor of two in each frequency band transmit mode at maximum power levels. As will be appreciated, power consumption is an important factor on laptop computers and other such devices that rely on limited battery power. As shown in the graph of FIG. 2, with a reduction in the receive mode noise figure, the overall noise figure can likewise be reduced for a given receiver gain. Further, as shown in the graph of FIG. 3, receiver sensitivity is enhanced as a result of the lower noise figure. Thus, as further shown in the graph of FIG. 4, line-of-sight link distances can almost be doubled, or the throughput can be increased for the same distance.

Figure 5:
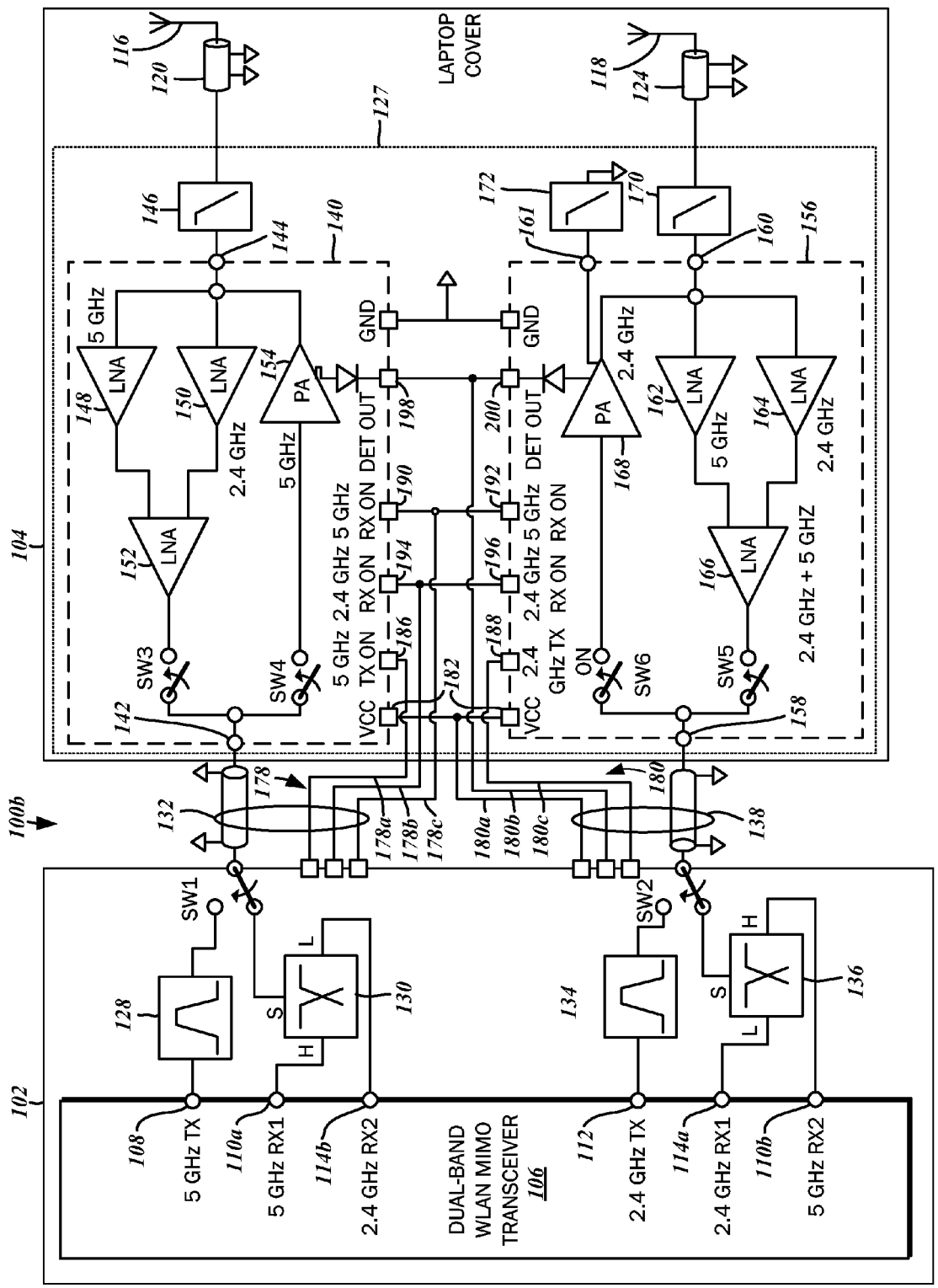
FIG. 5 is a block diagram of a second embodiment of the RF communications system with a reduced number of control and amplifier bias lines.

Based in part on the first embodiment of the RF communications system 100a, there is contemplated a second embodiment 100b, which is illustrated in FIG. 5. Therefore, the two embodiments share some similarities. However, as described above, the first embodiment of the RF communications system 100a utilizes a first set of five control and amplifier bias lines 174, as well as a second set of five control and amplifier bias lines 176. In the second embodiment, these are reduced to an alternative set of three control and amplifier bias lines 178 associated with the first interconnect cable 132, and an alternative set of three control and amplifier bias lines 180 associated with the second interconnect cable 138. Additionally, the two separate first and second transmit-receive modules 122, 126, may be consolidated into one transmit-receive module 127.

The following description will refer to specific ports of the control and amplifier bias lines 178, 180, and while such ports were not mentioned in relation to the description of the first embodiment of the RF communications system 100a, it will be recognized that they find correspondence thereto. In further detail, a bias supply port 182 of the first front end circuit 140 as well as a bias supply port 184 of the second front end circuit 156 are both tied to a first control and amplifier bias line 180a of the second interconnect cable 138. A first operating frequency band transmit enable port 186 is tied to a first control and amplifier bias line 178a of the first interconnect cable 132. A second operating frequency band transmit enable port 188 is tied to a third control and amplifier bias line 180c of the second interconnect cable 138. The first front end circuit 140 and the second front end circuit 156 each have respective first operating frequency band receive enable ports 190, 192, and both are connected to a third control and amplifier bias line 178c of the first interconnect cable 132. Similarly, the first front end circuit 140 and the second front end circuit 156 each have respective second operating frequency band receive enable ports 194, 196, with both being connected to a second control and amplifier bias line 178b of the first interconnect cable 132. The first operating frequency band power amplifier 154 and the second operating frequency band power amplifier 168 have a transmit power detector output port 198, 200. These are connected to a third control and amplifier bias line 180b of the second interconnect cable 138.

Based upon this configuration, simultaneous transmission of both the first operating frequency band signals and the second operating frequency band signals is possible. Additionally, simultaneous reception of both the first operating frequency band signals and the second operating frequency bands is possible. The following truth table 1 illustrates the possible signals on the first set of control and amplifier bias lines 174 and the second set of control and amplifier bias lines 176.

TABLE 1

| State | SW1 | First Operating Frequency Band Transmit Enable (186, 178a) | First Operating Frequency Band Receive Enable (190, 178c) | Second Operating Frequency Band Receive Enable (194, 178b) | SW2 | Second Operating Frequency Band Transmit Enable (188, 180c) | First Operating Frequency Band Receive Enable (192, 178c) | Second Operating Frequency Band Receive Enable (196, 178b) |
|---|---|---|---|---|---|---|---|---|
| 1 | 1 | 1 | 0 | 1 | 0 | 0 | 0 | 1 |
| 2 | 1 | 1 | 1 | 0 | 0 | 0 | 1 | 0 |
| 3 | 1 | 1 | X | X | 1 | 1 | X | X |
| 4 | 0 | 0 | 0 | 1 | 1 | 1 | 0 | 1 |
| 5 | 0 | 0 | 1 | 0 | 1 | 1 | 1 | 0 |
| 6 | 0 | 0 | 1 | 0 | 0 | 0 | 1 | 0 |
| 7 | 0 | 0 | 0 | 1 | 0 | 0 | 0 | 1 |
| 8 | 0 | 0 | 1 | 1 | 0 | 0 | 1 | 1 |

In a first state, the 5 GHz signal from the transceiver 106 is amplified and transmitted via the first antenna 116. Accordingly the transmit power detector output port 198 of the first front end circuit 140 is activated. Furthermore, the 2.4 GHz signal from the second antenna 118 is passed to the transceiver 106. The first operating frequency band receive enable port 190 is deactivated, as is the first operating frequency band receive enable port 192 that is tied thereto. Although the second operating frequency band receive enable port 196 of the second front end circuit 156 is activated and thereby activating the second operating frequency receive enable port 194 of the first front end circuit 140, because the third switch SW3 is open, no receive signals are amplified and passed. The fourth switch SW4 is closed, the fifth switch SW5 is opened, and the sixth switch SW6 is closed.

In a second state, the 5 GHz signal from the transceiver 106 is amplified and transmitted via the first antenna 116, and so the transmit power detector output port 198 of the first front end circuit 140 is activated. The 5 GHz signal from the second antenna 118 is passed to the transceiver 106. The first operating frequency band receive enable port 190 is activated, as is the first operating frequency band receive enable port 192 that is tied thereto. The second operating frequency band receive enable port 196 is deactivated, as is the second operating frequency band receive enable port 194 that is tied thereto. The fourth switch SW4 is closed, the third switch SW3 is opened, the fifth switch SW5 is closed, and the sixth switch SW6 is opened.

In a third state, the 5 GHz signal from the transceiver 106 is amplified and transmitted via the first antenna 116, and so the transmit power detector output port 198 of the first front end circuit 140 is activated. Additionally, the 2.4 GHz signal from the transceiver 106 is amplified and transmitted via the second antenna 118. As such, the transmit power detector output port 200 of the second front end circuit 156 is also activated. The first operating frequency band receive enable ports 190, 192 and the second operating frequency band receive enable ports 194, 196 are not pertinent, as no receive operations are taking place. The fourth switch SW4 is closed, the third switch SW3 is opened, the fifth switch SW5 is opened, and the sixth switch SW6 is closed.

In a fourth state, the 2.4 GHz signal from the transceiver 106 is amplified and transmitted via the second antenna 118, and so the transmit power detector output port 200 of the second front end circuit 156 is activated. The first operating frequency band receive enable ports 190, 192 of both the first and second front end circuits 140, 156 are deactivated, while the second operating frequency band receive enable ports 194, 196 are activated. Thus, the 2.4 GHz signal received on the first antenna 116 is amplified and passed to the transceiver 106. The fourth switch SW4 is opened, the third switch SW3 is closed, the fifth switch SW5 is opened, and the sixth switch SW6 is closed.

In a fifth state, the 2.4 GHz signal from the transceiver 106 is amplified and transmitted via the second antenna 118, and so the transmit power detector output port 200 of the second front end circuit 156 is activated. The first operating frequency band receive enable ports 190, 192 of both the first and second front end circuits 140, 156 are activated, while the second operating frequency band receive enable ports 194, 196 are deactivated. The 5 GHz signal on the first antenna 116 is amplified and passed to the transceiver 106. Additionally, the fourth switch SW4 is opened, the third switch SW3 is closed, the fifth switch SW5 is opened, and the sixth switch SW6 is closed.

In a sixth state, the 5 GHz signal from the first antenna 116, as well as the 5 GHz signal from the second antenna 118, are amplified by the respective first and second front end circuits 140, 156 and passed to the transceiver 106. More particularly, the first operating frequency band receive enable ports 190, 192 are activated, with the fourth switch SW4 opened, the third switch SW3 closed, the fifth switch SW5 closed, and the sixth switch SW6 opened. Since there are no transmitting operations, the first operating frequency band transmit enable port 186 and the second operating frequency band transmit enable port 188 are both deactivated.

In a seventh state, the 2.4 GHz signal from the first antenna 116 and the 2.4 GHz signal from the second antenna 118 are amplified by the respective first and second front end circuits 140, 156 and passed to the transceiver 106. The first operating frequency band receive enable ports 190, 192 are deactivated, while the second operating frequency band receive enable ports 194, 196 are activated. In addition, the fourth switch SW4 is opened, the third switch SW3 is closed, the fifth switch SW5 is closed, and the sixth switch SW6 is opened.

Again, because there are no transmitting operations, the first operating frequency band transmit enable port 186 and the second operating frequency band transmit enable port 188 are deactivated.

In an eighth state, both the 5 GHz signal and the 2.4 GHz signal on both the first antenna 116 and the second antenna 118 are amplified by the first and second front end circuits 140, 156 and passed to the transceiver 106. The first operating frequency band receive enable ports 190, 192, as well as the second operating frequency band receive enable ports 194, 196 are activated. Furthermore, the fourth switch SW4 is opened, the third switch SW3 is closed, the fifth switch SW5 is closed, and the sixth switch SW6 is opened. There are no transmitting operations in the eighth state, so the first operating frequency band transmit enable port 186 and the second operating frequency band transmit enable port 188 are deactivated.

It is contemplated that the reduction in the number of control and amplifier bias lines 174, 176 results in a reduction in the costs associated with the RF communications system 100b. Further reductions are understood to be possible if simultaneous operation in the manner discussed above is not required.

Figure 6:
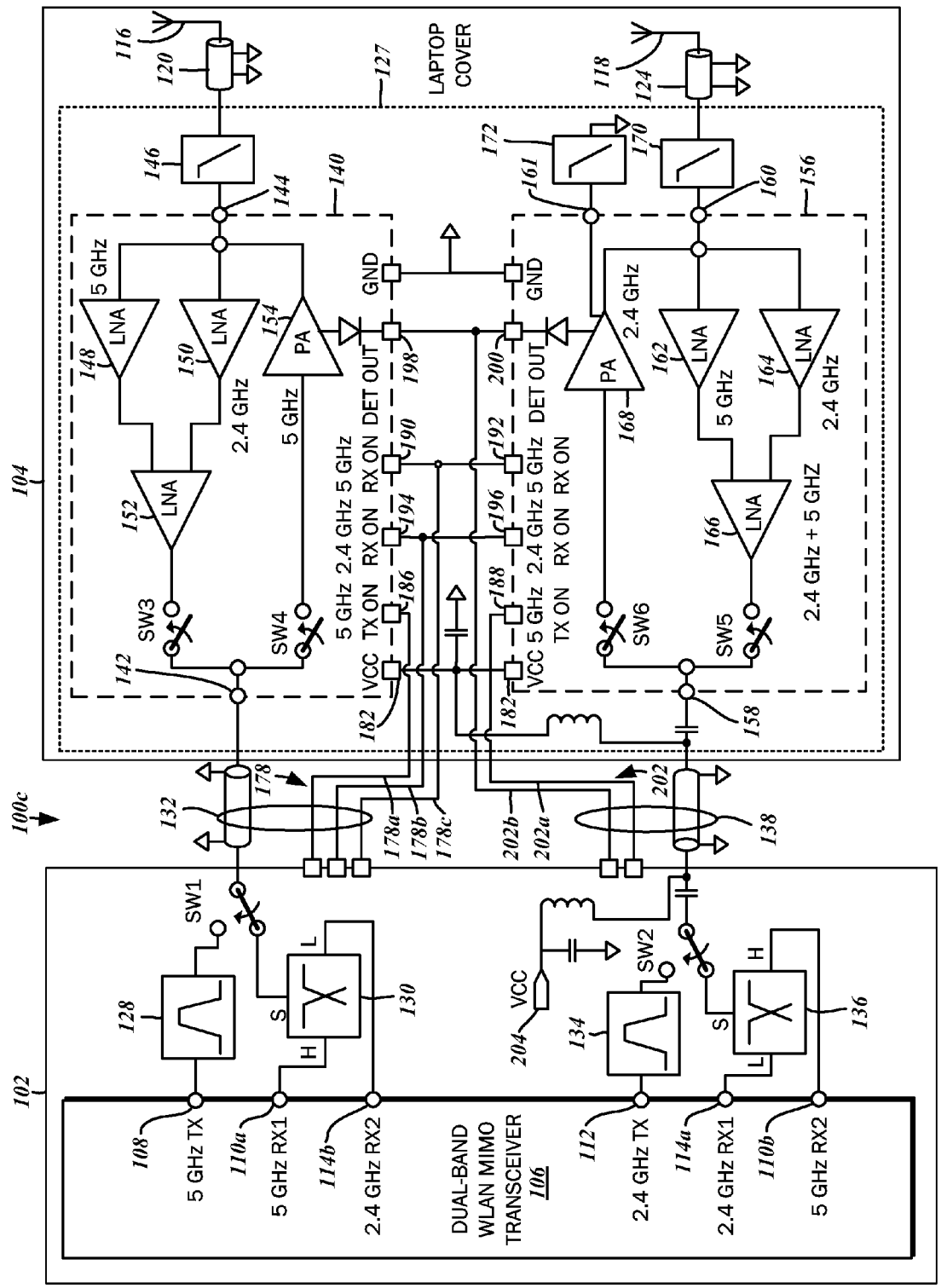
FIG. 6 is a block diagram of a third embodiment of the RF communications system with a bias supply voltage being provided over a signal transmission line of an interconnect cable.

FIG. 6 shows a third embodiment of the RF communications system 100c, which is contemplated to be based in part on the second embodiment 100b as well as the first embodiment 100a, and shares several similarities as well. Like the second embodiment 100b, there is a set of three alternate control and amplifier bias lines 178 associated with the first interconnect cable 132. The first control and amplifier bias line 178a is understood to be connected to the first operating frequency band transmit enable port 186. Additionally, the second control and amplifier bias line 178b is understood to be connected to the second operating frequency band receive enable port 194 of the first front end circuit 140 and the second operating frequency band receive enable port 196 of the second front end circuit 156. The third control and amplifier bias line 178c is understood to be connected to both of the first operating frequency band receive enable port 190 of the first front end circuit 140 and the first operating frequency band receive enable port 192 of the second front end circuit 156. The first front end circuit 140 and the second front end circuit 156, along with the various harmonics filters 146, 170, 172, are incorporated into the one transmit-receive module 127.

The third embodiment of the RF communications system 100c, however, contemplates a set of control lines 202 that are associated with the second interconnect cable 138. Again, there is a first control line 202a that is connected to the first operating frequency band transmit enable port 188. Also, the transmit power detector output ports 198, 200 are connected to a second control line 202b. The bias supply voltage from VCC 204, however, is delivered through the signal transmission line of the second interconnect cable 138, further reducing the number of control lines extending from the body segment 102 to the cover segment 104.

Figure 7:
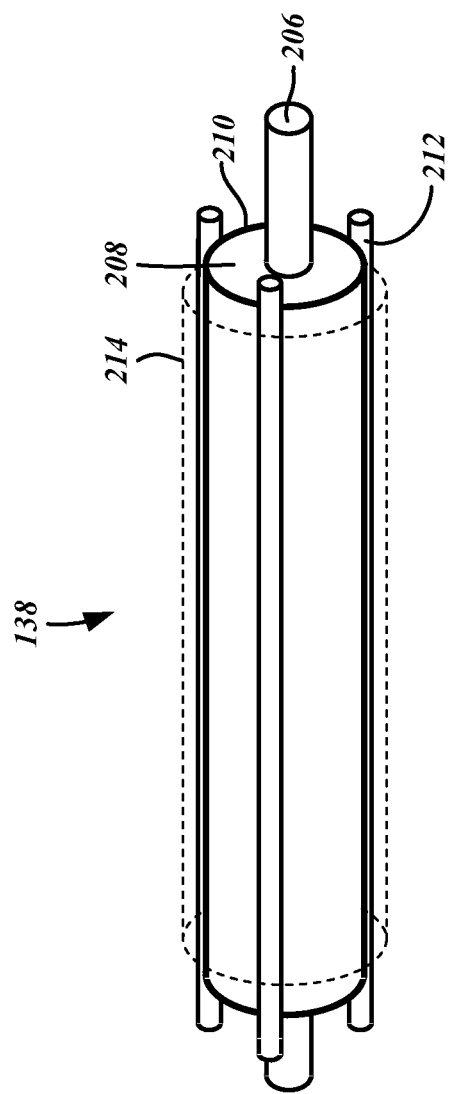
FIG. 7 is a perspective view of the interconnect cable utilized in the RF communications system.

Referring now to FIG. 7, details pertaining to the second interconnect cable 138 capable of carrying the bias supply voltage will be considered. There is a coaxial center conductor 206 that extends along the length of the cable 138. As the coaxial center conductor 206 carries RF signals as well as the bias supply voltage, it is constructed of an electrically conductive material. There is a flexible insulating layer 208 that shrouds or covers the coaxial center conductor 206, and encompassing the insulating layer 208 is a coaxial outer conductor 210. It will be appreciated that a separate ground or common line is not needed, as the coaxial outer conductor 210 can serve as such.

Disposed about the outer diameter of the coaxial outer conductor 210 are one or more electrically isolated control line carrier conductors 212 that also extend along the length of the cable 138. These control line carrier conductors 212 are understood to correspond to the control lines 202 mentioned above. The diameter of the control line carrier conductors 212 can be minimal, as the control lines 202 have low current drain due to the use of CMOS (complementary metal-oxide semiconductor) logic in the front end circuits 140, 156. There is also a cover 214 that wraps around the control line carrier conductors 212 and the coaxial outer conductor 210.

Figure 8:
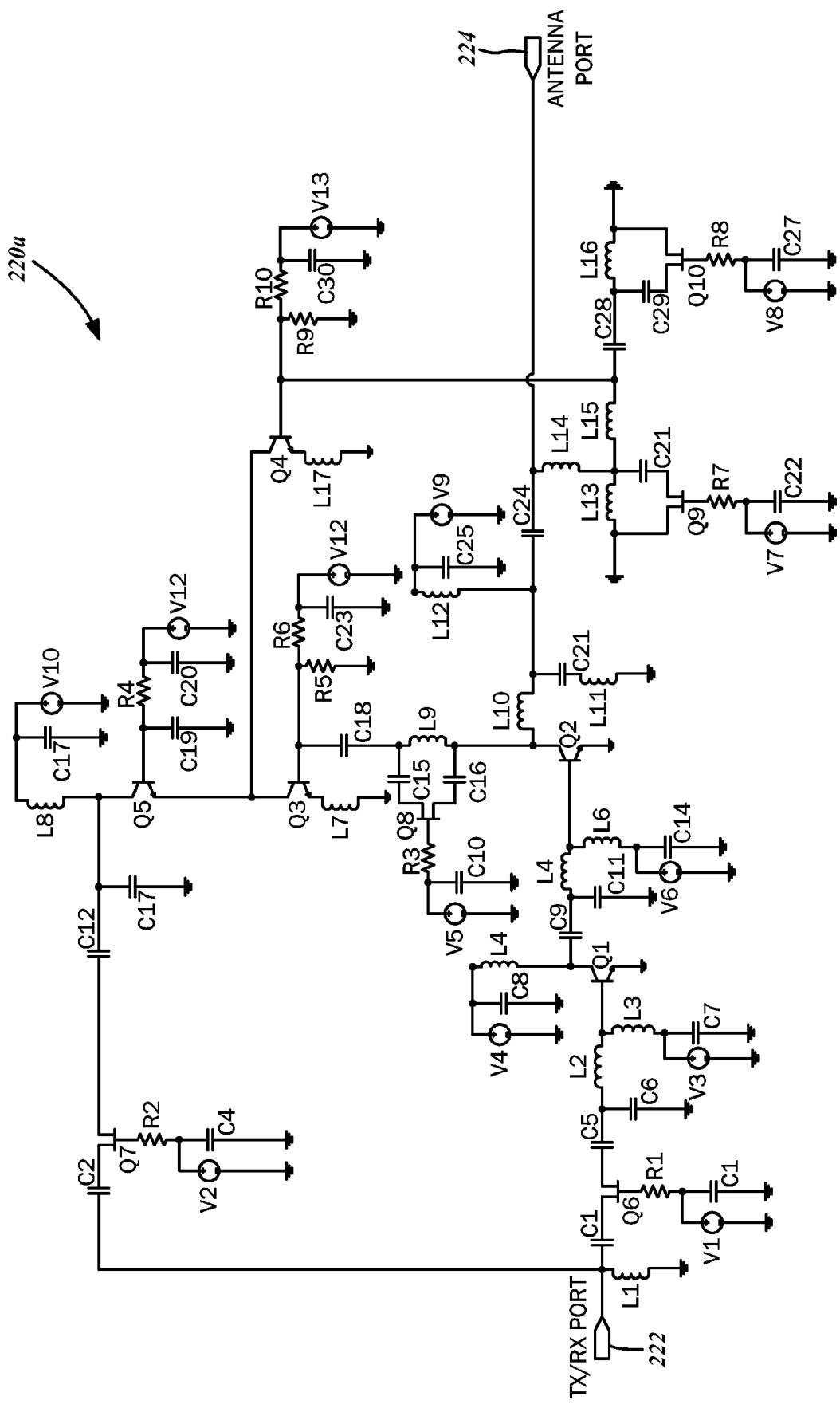
FIG. 8 is a schematic diagram of a basic first embodiment of a RF front end circuit.

FIG. 8 is a schematic diagram showing additional details of a first embodiment of a front end circuit 220a, which can be utilized as the first front end circuit 140 or the second front end circuit 156. As mentioned above in relation to the various RF communication systems 100, the front end circuit 220a includes a first or transmit-receive port 222, and a second or antenna port 224. Generally, the front end circuit 220a is comprised of a first operating frequency band transmit chain based on transistors Q1 and Q2, a first operating frequency band receive chain based on transistors Q3 and Q5, and a second operating frequency band receive chain based on transistors Q4 and Q5. The cascode transistor Q5 is shared by the first operating frequency band receive chain and the second operating frequency band receive chain. Switching transistors Q9 and Q10 are deactivated during the first operating frequency band transmit mode, and the second operating frequency band receive mode. In the second operating frequency band receive mode, the switching transistor Q9 is either activated or deactivated, while the switching transistor Q10 is activated. The switching transistor Q7 and the circuitry associated therewith is understood to correspond to either the third switch SW3 of the first front end circuit 140 or the sixth switch SW6 of the second front end circuit 156. Furthermore, the switching transistor Q6 and its associated circuitry correspond to either the fourth switch SW4 of the first front end circuit 140 or the fifth switch SW5 of the second front end circuit 156.

The specifics relating to the operational features of the circuit elements and component selection/adjustments have been described in applicant's co-pending applications that were mentioned above and are incorporated by reference. In general, the inductors L13, L14, L15, and L16, as well as capacitor C28, are optimized for the first operating frequency band performance requirements, while the capacitors C16 and C19 are selected to match with the base input of the transistor Q4 in an activated state, or the low noise amplifier for the second operating frequency band.

Although the above description involves a front end circuit 220a for transmitting on a first operating frequency band, it is also possible to configure the same for transmitting on a second operating frequency band. That is, the transistors Q1 and Q2 define the second operating frequency transmit chain, the transistors Q3 and Q5 define the second operating frequency band receive chain, and the transistors Q4 and Q5 define a first operating frequency band receive chain. Again, the cascode transistor Q5 is shared by the first operating frequency band receive chain and the second operating frequency band receive chain. The inductors L13, L14, L15, and L16, as well as capacitor C28, are then based upon the performance specifications for transmission on the second operating frequency band, while the capacitors C16 and C15 are selected for matching with the input of the transistor Q4 in an activated state, which is a part of the first operating frequency receive chain.

Figures 9, 9A:
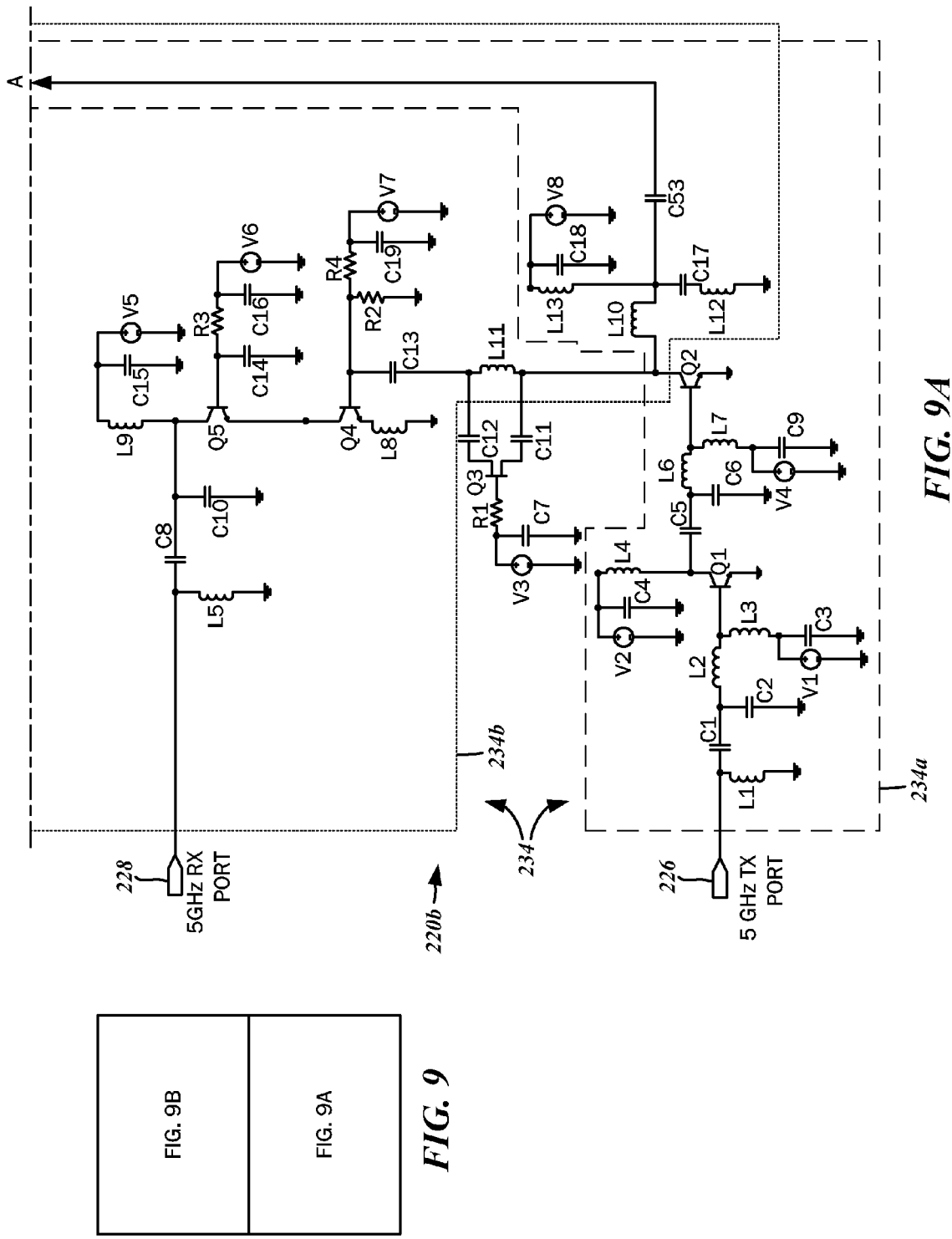
FIGS. 9, 9A, and 9B are schematic diagrams showing various segments of a second embodiment of the RF front end circuit with separate transmit and receive ports for a first operating frequency band and a second operating frequency band.
Figure 9B:
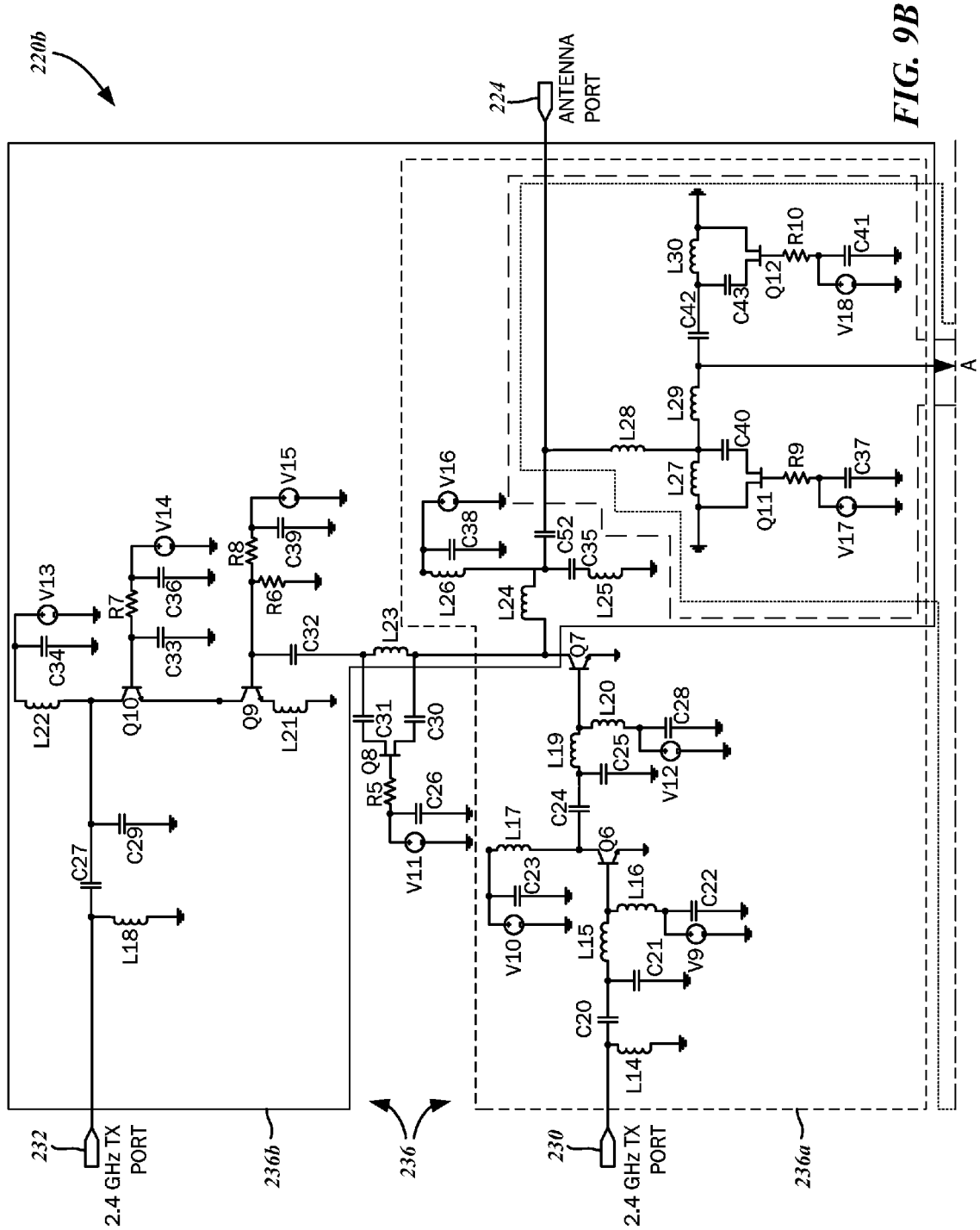

With reference to the schematic diagram of FIG. 9, and in particular, to FIGS. 9A and 9B, a second embodiment of the front end circuit 220b may be utilized with a transceiver 106 that has a receive port and a transmit port for each operating frequency. In this regard, the front end circuit 220b has a first operating frequency band transmit port 226, a first operating frequency band receive port 228, a second operating frequency band transmit port 230, and a second operating frequency band receive port 232. The front end circuit 220b is connected to a single antenna, and thus has one antenna port 224. In general, the front end circuit 220b can be segregated into a first operating frequency band block 234, shown in FIG. 9A, and a second operating frequency block 236, shown in FIG. 9B.

The first operating frequency band block 234 may be further segregated into a first operating frequency band transmit block 234a, and a first operating frequency band receive block 234b. The first operating frequency band transmit block 234a is a two-stage power amplifier based upon transistors Q1, Q2, and associated control, biasing, and matching circuits, while the first operating frequency band receive block 234b is a low noise amplifier based upon a transistor Q4 and a cascode transistor Q5, with associated control, biasing and matching circuits.

Similarly, the second operating frequency band block 236 may be segregated into a second operating frequency band transmit block 236a and a second operating frequency band receive block 236b. The second operating frequency band transmit block 236a is a two-stage power amplifier with transistors Q6 and Q7, as well control, biasing, and matching circuits associated therewith. The second operating frequency band receive block 236b is a low noise amplifier based upon transistors Q9 and Q10 in a cascode architecture, and associated control, biasing and matching circuits.

Again, the specifics relating to the operational features of the circuit elements and component selection/adjustments have been described in applicant's co-pending applications that were mentioned above and are incorporated by reference.

The front end circuit 220b thus configured is understood to have four operational modes: a first operating frequency band transmit mode, a first operating frequency band receive mode, a second operating frequency band transmit mode, and a second operating frequency band receive mode. The functionality of the front end circuit 220b will now be described in relation to these operational modes.

In a first operating frequency band transmit mode, transistors Q1 and Q2 of the first operating frequency band power amplifier noted above, are activated. Additionally, the transistors Q4 and Q5 associated with the first operating frequency band low noise amplifier are deactivated, as are the transistors Q6 and Q7 of the second operating frequency band power amplifier and the transistors Q9 and Q10 of the second operating frequency band low noise amplifier.

As referenced herein, activation and deactivation of the various transistors is understood to include applying appropriate voltage levels thereto. The activated state refers to a low series resistance of the transistor, typically in the range of a few Ohms to several tens of Ohms. The deactivated state refers to a substantially high series resistance, typically in the range of several Kilo-Ohms and higher.

The switching transistor Q8 of the second operating frequency band block 236 may be activated or deactivated, while the switching transistor Q3 of the first operating frequency band block 234 is activated. Deactivating the switching transistor Q8 is understood to be appropriate if the voltage swing at the base-emitter junction of the second operating frequency low noise amplifier transistor Q9 in the deactivated state is sufficiently low when the first operating frequency power amplifier is generating high output power levels. An acceptable voltage swing may be less than 3V. However, if it is greater, than the switching transistor Q8 may be activated.

A common switching transistor Q12 shared by the first operating frequency band block 234 and the second operating frequency band block 236 is deactivated. Another common switching transistor Q11 also shared by the first operating frequency band block 234 and the second operating frequency band block 236 can be either activated or deactivated. A first operating frequency band RF transmission signal on the first operating frequency band transmit port 226 is amplified by the transistor stages of Q1 and Q2, and passed to the antenna port 224.

There are several component selection considerations for the first operating frequency band block 234 that relate to the functionality discussed above. The values of the capacitors C11 and C12, along with the resistance of the transistor Q3 in the activated state are selected to define a parallel resonant circuit with the inductor L11 in the first operating frequency band. This resonant resistance is understood to be at least three to five times higher than the resistive part of the output impedance required for the transistor Q2 in the first operating frequency band. Thus, the first operating frequency band low noise amplifier is contemplated to have minimal influence over the performance of the first operating frequency band power amplifier. Furthermore, the voltage swing across the base-emitter junction of the transistor Q4 at high transmit power levels is minimized.

With the impedance from the antenna port 224 having a negative imaginary part when the transistor Q7 is deactivated and the inductor L28 is disconnected, there is a capacitive load. Accordingly, the inductors L27, L28, and L29 are selected to compensate therefor. The value of the inductor L27 and the capacitor C40, along with the series resistance of the switching transistor Q11 in the activated state are also selected to compensate for the aforementioned capacitive load. Along these lines, the value of the inductor L30, the capacitor C43, and the series resistance of the switching transistor Q12 when activated are likewise selected to compensate for the capacitive load. The equivalent inductance of the first operating frequency power amplifier is set for optimal performance based upon the values of the inductors L27, L28, L29, and L30 and the values of the capacitors C40 and C43, and accounting for the series resistance of the switching transistors Q11 and Q12 in the activated state. More particularly, this equivalent inductance Leqv is understood to be L28+L27*L29/(L28+L29).

In a first operating frequency band receive mode, the transistors Q4 and Q5 associated with the first operating frequency band low noise amplifier are activated. The transistors Q1 and Q2 of the first operating frequency band power amplifier are deactivated, as are the transistors Q6 and Q7 of the second operating frequency band power amplifier and the transistors Q9 and Q10 of the second operating frequency band low noise amplifier. The switching transistor Q3 of the first operating frequency band block 234 and the switching transistor Q8 of the second operating frequency band block 236 are deactivated. The common switching transistor Q12 is activated, while the other common switching transistor Q11 may be either activated or deactivated. A first operating frequency band RF transmission signal on the antenna port 224 is amplified by the transistor stages of Q4 and Q5, and passed to the first operating frequency band receive port 228.

Again, there are several component selection considerations for the first operating frequency band block 234 that relate to the functionality above. In particular, the size and operating conditions of the transistor Q4 are selected to achieve a substantially similar resistive part of the impedance between the base of the transistor Q4 and ground in an activated state in the first operating frequency band, and the resistive part of the output impedance required for the transistor Q2 in the activated state, thereby optimizing the linear operation of the same. The capacitor C13 and the inductor L11 are selected to minimize the noise figure of the first operating frequency band receive block 234b during activation to be at most 3 dB. Furthermore, the values of the capacitor C13 and the inductor L11 are selected to obtain a good matching of the activated first operating frequency band receive block 234b at the antenna port 224. The input return loss (S11) is contemplated to be less than −10 dB in the first operating frequency band. The selection of the capacitor C13 and the inductor L11 also involves the consideration of lowering the voltage swing at the base-emitter junction of the transistor Q4 when is deactivated while the first operating frequency band power amplifier is activated and transmitting at maximum power levels.

The second operating frequency band block 236 is understood to operate in a substantially similar way as the first operating frequency band block 234 as described above. In a second operating frequency band transmit mode, transistors Q6 and Q7 of the second operating frequency band power amplifier are activated. Additionally, the transistors Q9 and Q10 associated with the second operating frequency band low noise amplifier are deactivated, as are the transistors Q1 and Q2 of the first operating frequency band power amplifier and the transistors Q4 and Q5 of the first operating frequency band low noise amplifier. The switching transistor Q8 of the second operating frequency band block 236 is activated, while the switching transistor Q3 of the first operating frequency band block 234 is deactivated. The common switching transistors Q11 and Q12 shared by the first operating frequency band block 234 and the second operating frequency band block 236 are deactivated. A second operating frequency band RF transmission signal on the second operating frequency band transmit port 230 is amplified by the transistor stages of transistors Q6 and Q7, and passed to the antenna port 224.

The values of the capacitors C30 and C31, along with the resistance of the transistor Q8 in the activated state are selected to define a parallel resonant circuit with the inductor L23 in the second operating frequency band. This resonant resistance is understood to be at least three to five times higher than the resistive part of the output impedance required for the transistor Q7 in the first operating frequency band. Thus, the second operating frequency band low noise amplifier is contemplated to have minimal influence over the performance of the second operating frequency band power amplifier. Furthermore, the voltage swing across the base-emitter junction of the transistor Q9 at high transmit power levels is minimized.

The capacitor C42 and the inductor L30 are selected to define a series resonance at the second operating frequency band. The resistive part of the impedance is contemplated to be below 2 to 5 Ohms, thus minimizing the influence of the first operating frequency band block 234.

In a second operating frequency band receive mode, the transistors Q9 and Q10 associated with the second operating frequency band low noise amplifier are activated. The transistors Q6 and Q7 of the second operating frequency band power amplifier are deactivated, as are the transistors Q1 and Q2 of the first operating frequency band power amplifier and the transistors Q4 and Q5 of the second operating frequency band low noise amplifier. The switching transistor Q3 of the first operating frequency band block 234 and the switching transistor Q8 of the second operating frequency band block 236 are deactivated. The common switching transistors Q11 and Q12 are deactivated. A second operating frequency band RF transmission signal on the antenna port 224 is amplified by the transistor stages of transistors Q9 and Q10, and passed to the second operating frequency band receive port 232.

The size and operating conditions of the transistor Q9 are selected to achieve a substantially similar resistive part of the impedance between the base of the transistor Q9 and ground in an activated state in the second operating frequency band, and the resistive part of the output impedance required for the transistor Q7 in the activated state, thereby optimizing the linear operation of the same. The capacitor C32 and the inductor L23 are selected to minimize the noise figure of the second operating frequency band receive block 236b during activation to be at most 3 dB. Furthermore, the values of the capacitor C32 and the inductor L23 are selected to obtain a good matching of the activated second operating frequency band receive block 236b at the antenna port 224. The input return loss (S11) is contemplated to be less than −10 dB in the second operating frequency band. The selection of the capacitor C32 and the inductor L23 also involves the consideration of lowering the voltage swing at the base-emitter junction of the transistor Q9 when is deactivated while the second operating frequency band power amplifier is activated and transmitting at maximum power levels.

With the contemplated use of the various front end circuits in IEEE 802.11 wireless networking applications, several transmit performance requirements are imposed thereby. For instance, adequate spectrum purity is necessary, such that the performance of other wireless communications systems that may be concurrently operating is not degraded. Another requirement is signal harmonics rejection, which, as described above in relation to the RF communications systems 100, can be implemented external to the front end circuit in the connection to the antennas 116, 118. The second order harmonics of the 2.4 GHz operating frequency band falls in to the 5 GHz operating frequency band, and so as to avoid degrading the performance in the 5 GHz operating frequency band, there is no filtering at a common port. The second embodiment of the front end circuit 220b includes a second order harmonics filter comprised of the series resonance chain including the capacitor C35 and the inductor L25 for the second operating frequency band of 2.4 GHz, as well as the series resonance chain with the capacitor C17 and inductor L12 for the first operating frequency band of 5 GHz. Further, implementing these series resonance chains externally with lumped elements is understood to sufficiently reject the second order harmonics that may not be possible with on-die implementations. In this regard, the second order harmonic filter for the 5 GHz operating frequency band can be provided on-die, with additional external filtering for the third and higher order harmonics of the 2.4 GHz operating frequency band.

Notwithstanding the disclosed specifics of the second embodiment of the front end circuit 220b above, it will be recognized that several other additional features disclosed in Applicant's co-pending applications incorporated by reference herein may also be included. Along these lines, while the 5 GHz operating frequency band was referred to as the first operating frequency band, and the 2.4 GHz operating frequency band was referred to the second operating frequency band, this is by way of example only and not of limitation. The specific operating frequency bands may be reversed, and the above description of the features would be applicable to such alternative embodiments as well. The front end circuit 220b, and in particular the transistors of the low noise amplifiers and the power amplifiers thereof, are shown as bipolar junction type devices, and the switching transistors are shown as field-effect type devices. However, any other suitable transistor type or semiconductor technology may be substituted.

Figure 10B:
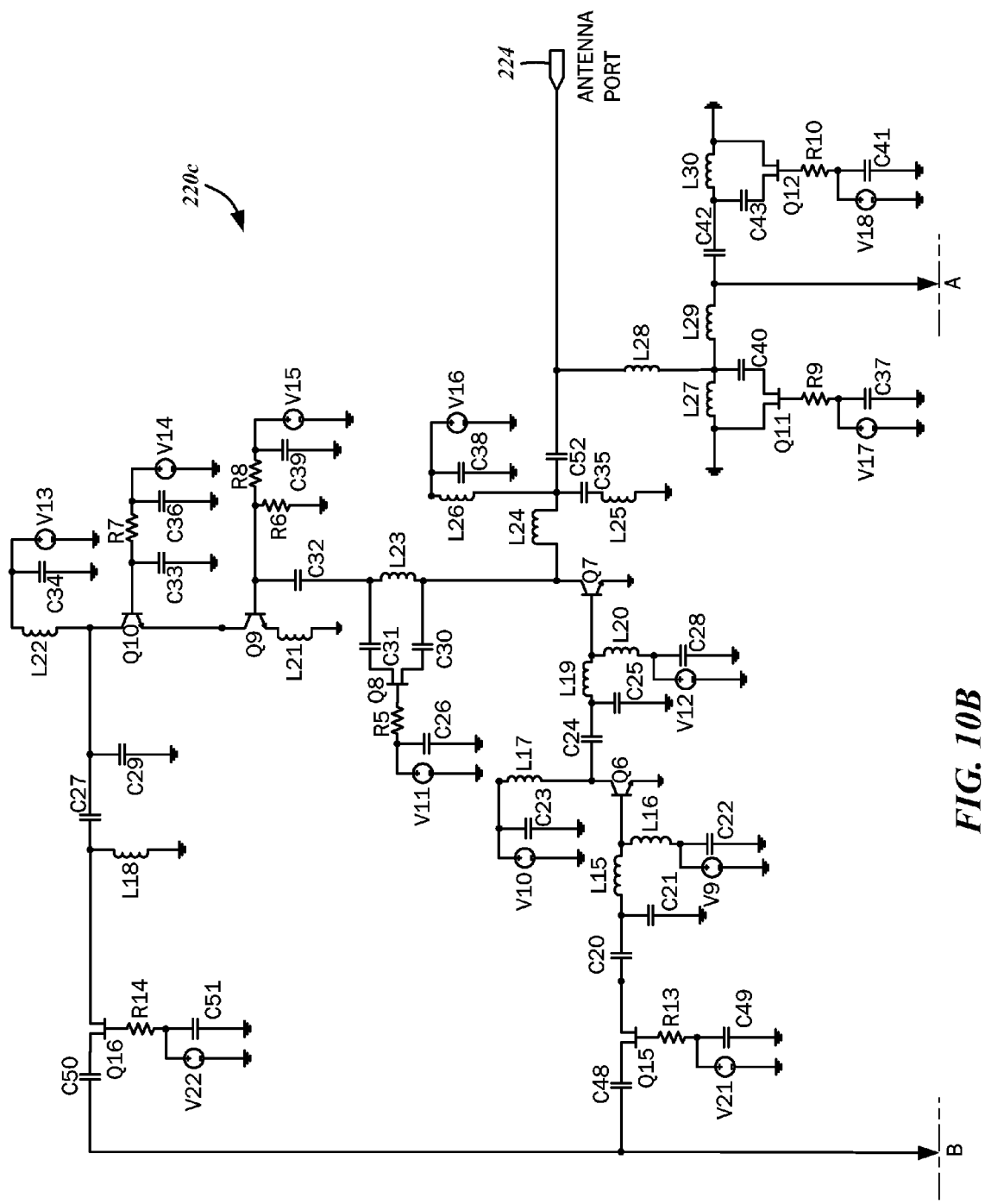

As shown in the schematic diagrams of FIGS. 10, 10A, and 10B, a third embodiment of the front end circuit 220c may be utilized with a transceiver 106 that has a single transmit-receive line for a first operating frequency band and a second operating frequency band. Accordingly, the front end circuit 220c has a transmit-receive port 238. The front end circuit 220c is also connected to an antenna, for which there is the one antenna port 224. The operational characteristics and the selection of components of the third embodiment of the front end circuit 220c are similar to those of the second embodiment of the front end circuit 220b. Generally, it is understood that received RF signals are amplified by various low noise amplifiers tuned for a particular operating frequency band and activated in a predetermined manner, and transmitted RF signals are amplified by various power amplifiers also tuned for a particular operating frequency band and activated in a different predetermined manner.

There are some differences, however, relating to the switching circuitry for connecting the multiple inputs to the power amplifiers and the multiple outputs from the low noise amplifiers to the one transmit-receive port 238. Namely, the input for the first operating frequency band power amplifier is connected to the transmit-receive port 238 via a switching transistor Q13 and a decoupling capacitor C44, with the switching transistor Q13 being switched on and off with a control voltage V19. The output of the first operating frequency band low noise amplifier is connected to the transmit-receive port 238 via a switching transistor Q14 and a decoupling capacitor C46. The switching transistor Q14 is switched on and off with a control voltage V20. Additionally, the input for the second operating frequency band power amplifier is connected to the transmit-receive port 238 via a switching transistor Q15 and a decoupling capacitor C48. As with the others, the switching transistor Q15 is switched on and off with a control voltage V21. Finally, the output of the second operating frequency band low noise amplifier is connected to the transmit-receive port 238 via a switching transistor Q16 that is switched on and off with a control voltage V22. There is also a decoupling capacitor C50. It is understood that with the switching transistors turned on or in an activated state, there is a low series resistance of typically less than 5 Ohm. With the switching transistors turned off or in a deactivated state, there is a high resistance of greater than 1 k Ohms. The switching transistors are understood to have a small size and lower power dissipation, as the typical RF signal before amplification by the power amplifier and even after amplification by the low noise amplifier, is well below 10 dBm.

In the first operating frequency band transmit mode, along with the appropriate amplifier transistors being activated as described above, the switching transistor Q13 is activated, while the other switching transistors Q14, Q15, and Q16 are deactivated. The first operating frequency band signal on the transmit-receive port 238 is passed through the switching transistor Q13 and amplified by the transistors Q1 and Q2, and then passed to the antenna port 224.

In the first operating frequency band receive mode, along with the appropriate amplifier transistors being activated as described above, the switching transistor Q14 is activated, while the remaining switching transistors Q13, Q15, and Q16 are deactivated. The first operating frequency band signal on the antenna port 224 is amplified by the transistors Q4 and Q5, and passed through the switching transistor Q14 to the transmit-receive port 238.

In the second operating frequency band transmit mode, along with the appropriate amplifier transistors being activated as described above, the switching transistor Q15 is activated, while the other switching transistors Q13, Q14, and Q16 are deactivated. The second operating frequency band signal on the transmit-receive port 238 is passed through the switching transistor Q15 and amplified by the transistors Q6 and Q7, and then passed to the antenna port 224.

In the second operating frequency band receive mode, along with the appropriate amplifier transistors being activated as described above, the switching transistor Q16 is activated, while the remaining switching transistors Q13, Q14, and Q15 are deactivated. The second operating frequency band signal on the antenna port 224 is amplified by the transistors Q9 and Q10, and passed through the switching transistor Q16 to the transmit-receive port 238.

As indicated above, the performance of the second embodiment of the front end circuit 220b is substantially similar to that of the third embodiment 220c. However, there are some differences, including a slightly lower gain in the transmit and receive modes attributable in part to the switching transistors Q13, Q14, Q15, and Q16. However, this loss in gain can be compensated with appropriate tuning of the matching circuits, as well as the operating currents of the front end circuit 220b. The noise figure degradation in the receive chains is below 0.1-0.2 dB, with the gain of the same being set to above 10 dB.

Figure 11A:
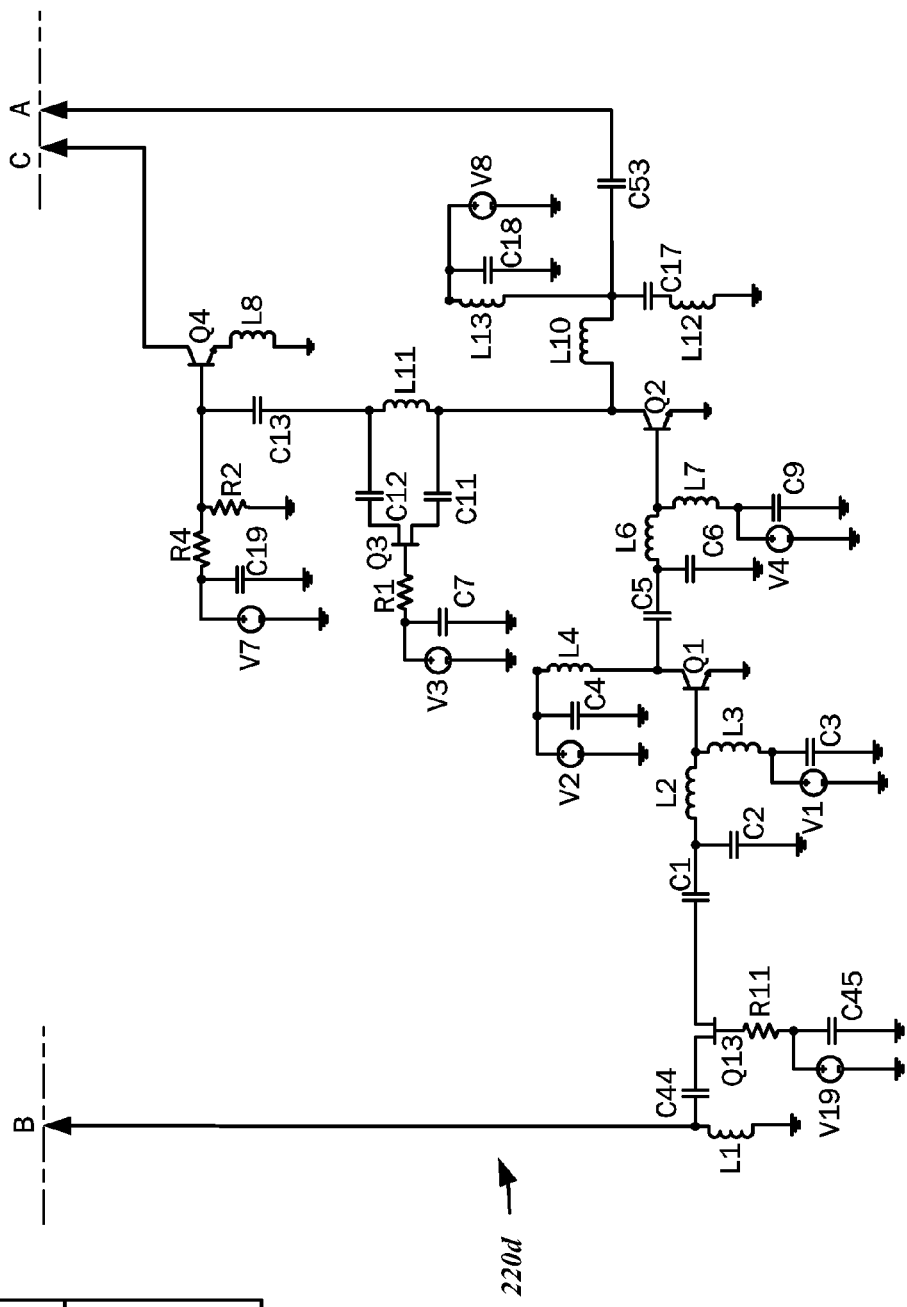
FIGS. 11, 11A, and 11B are schematic diagrams showing various segments of a fourth embodiment of the RF front end circuit.
Figure 11:
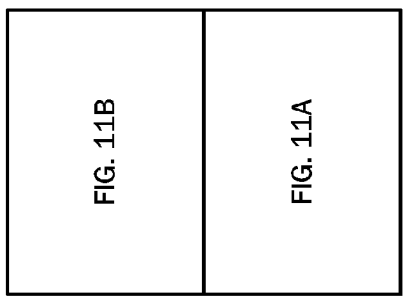
Figure 11B:
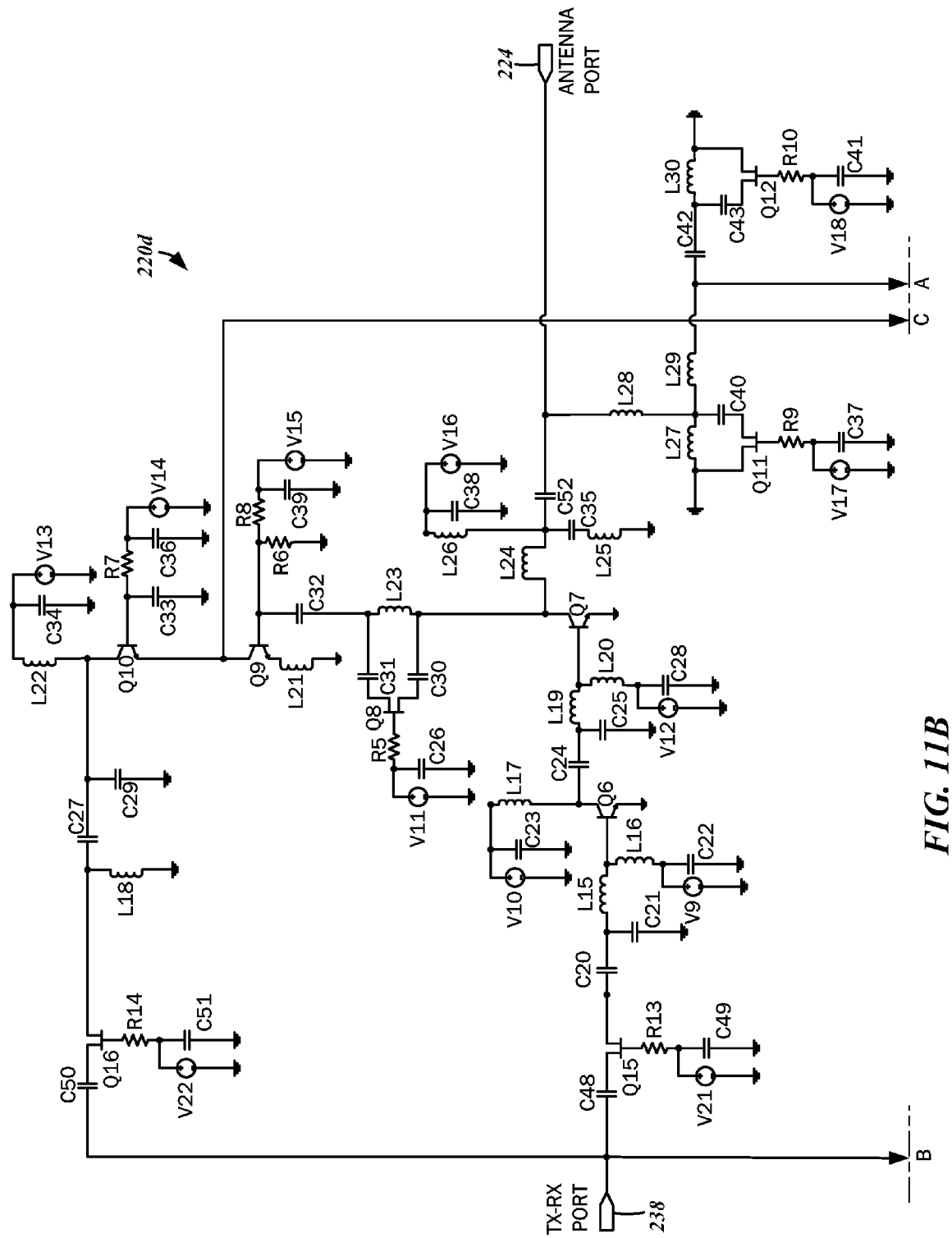

FIG. 11, and in particular, FIGS. 11A and 11B, depict a fourth embodiment of the front end circuit 220d that may be utilized with a transceiver 106 that has one transmit-receive line for a first operating frequency band and a second operating frequency band. In this regard, the fourth embodiment 220d is similar to the third embodiment 220c discussed above, and the operational characteristics and the selection of components are as well. Like that embodiment, the front end circuit 220d has the one transmit-receive port 238 and the one antenna port 224.

Instead of utilizing and independent cascode transistor such as transistor Q5 for the first operating frequency band low noise amplifier, the cascode transistor Q10 is shared with the second operating frequency low noise amplifier. Thus, the die area may be reduced as a result of eliminating one cascode transistor. Furthermore, with the shared cascode transistor, there is no longer a need for the switching transistor Q14, as well as the output matching circuits associated with the independent cascode transistor.

In both the first operating frequency receive mode and the second operating frequency receive mode, the shared transistor Q10 is activated. Additionally, the output matching circuit including the inductor L22 and capacitors C27 and C29 are tuned for both the first operating frequency band and the second operating frequency band, while the transistor Q4 is tuned specifically for the first operating frequency band and the transistor Q9 is tuned specifically for the second operating frequency band in the same manner discussed above.

Figures 12, 12A, 12B:
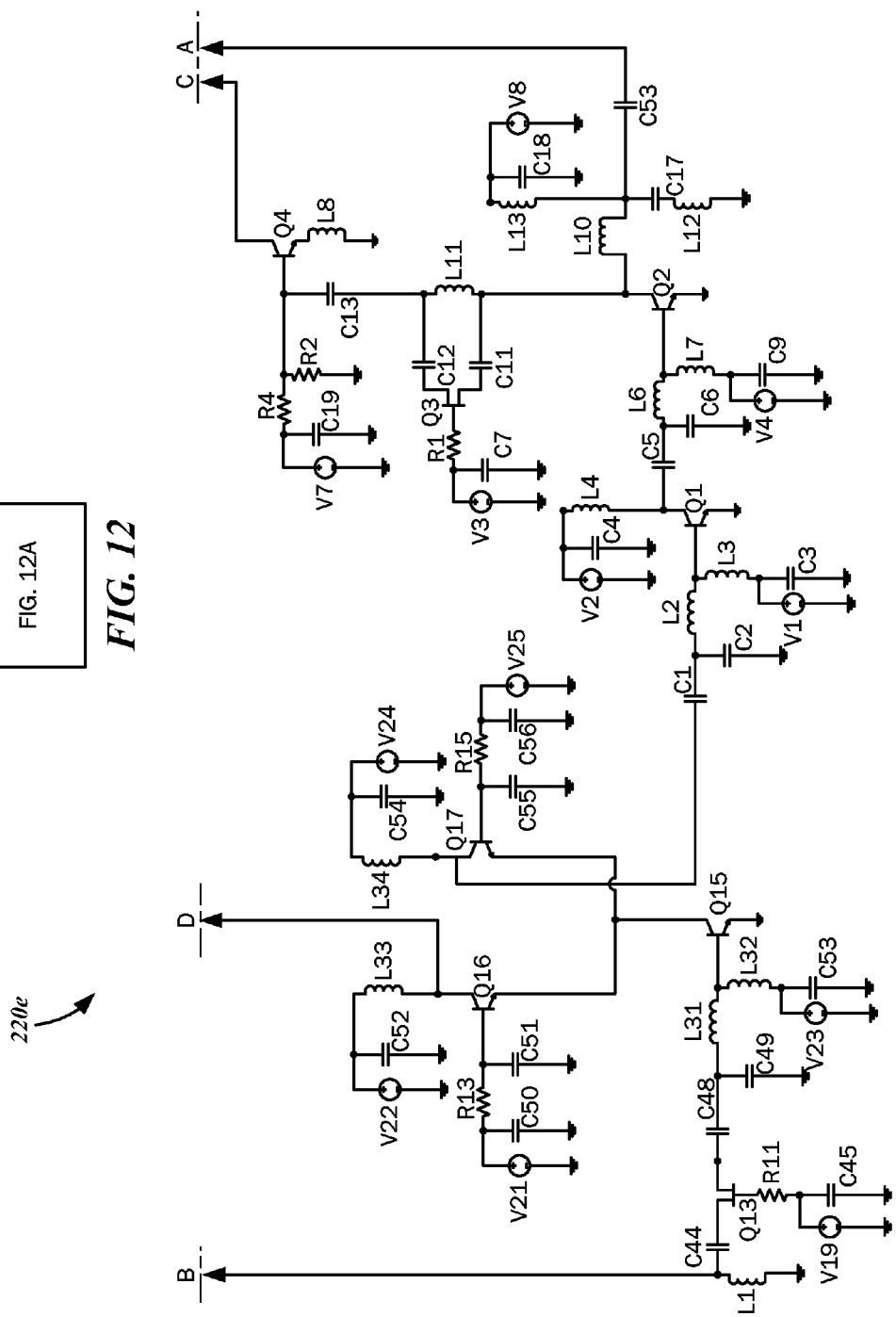
FIGS. 12, 12A, and 12B are schematic diagrams showing various segments of a fifth embodiment of the RF front end circuit.
Figure 12B:
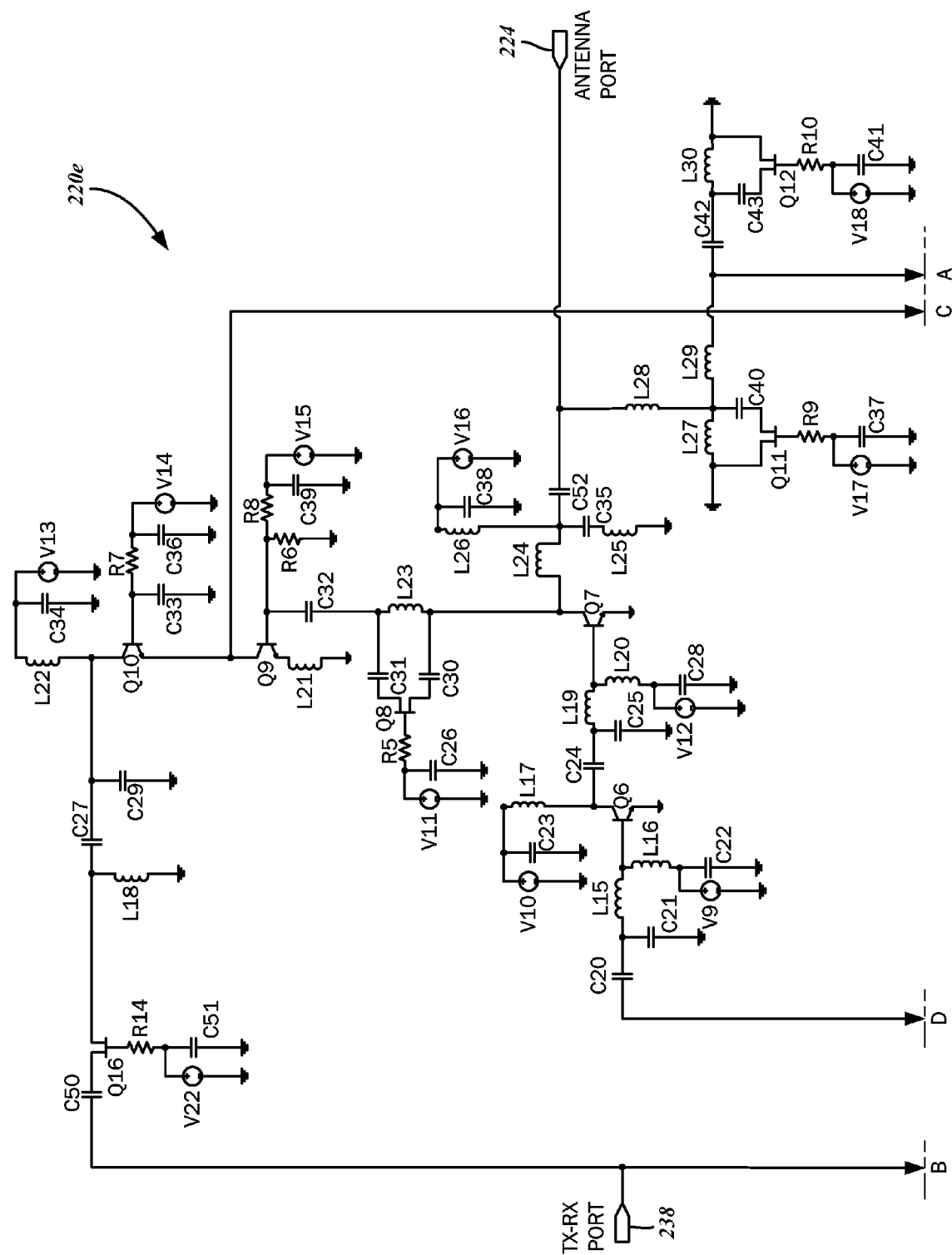

FIG. 12, as well as FIGS. 12A and 12B, show fifth embodiment of the front end circuit 220e that may be utilized with a transceiver 106 that has a single transmit-receive line for a first operating frequency band and a second operating frequency band. This embodiment 220e is similar to the third embodiment 220c and the fourth embodiment 220d discussed above, particularly with regard to the operational characteristics and the selection of components. Like those previously described embodiments, the front end circuit 220e has the one transmit-receive port 238 and the one antenna port 224.

Further to the fourth embodiment 220d, another switching transistor, that is, the switching transistor Q15 thereof, is eliminated in the fifth embodiment 220e. Instead, the inputs of the second operating frequency power amplifier and the first operating frequency power amplifier are connected to a respective one of the cascode transistors Q16, Q17 with a common transistor Q15.

Appropriate matching circuitry is included for each of these transistors. The switching transistor Q15 is activated for both the first operating frequency band transmit mode as well as the second operating frequency band transmit mode. The matching circuit for the cascode transistor Q17, including the inductors L34, L2, and L3, and capacitors C1 and C2 are tuned to match the impedance of the collector of the cascode transistor Q17 to the base of the transistor Q1 in the first operating frequency band. Likewise, the matching circuit for the cascode transistor Q16, including the inductors L33, L15, L16, and capacitors C20 and C21 are tuned to match the impedance of the collector of the cascode transistor Q16 to the base of the transistor Q6 in the second operating frequency band.

The cascode transistor Q17 is activated in the first operating frequency band transmit mode, along with the aforementioned power amplifier transistors Q1 and Q2. The cascode transistor Q16 is activated in the second operating frequency band transmit mode together with the power amplifier transistors Q6 and Q7. As will be recognized, additional amplification is provided by the transistors Q15, Q16, and Q17, and is therefore suitable for Wireless LAN implementations in which the transceiver 106 have a low transmit output power, and or substantial losses between the transceiver 106 and the front end circuit 220e.

Figure 13:
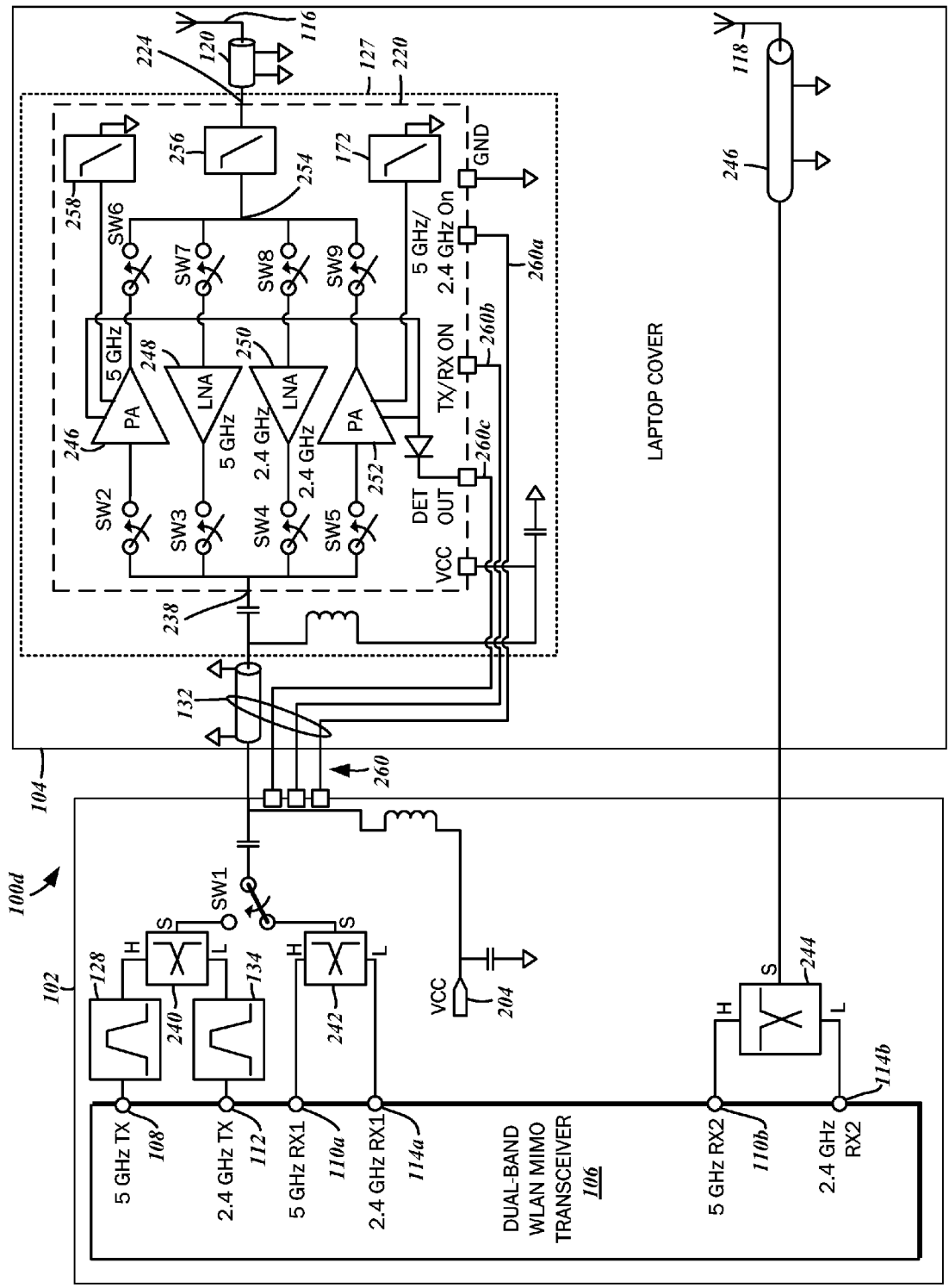
FIG. 13 is a block diagram of a fourth embodiment of the RF communications system with a first front end circuit as shown in FIGS. 10, 11, and 12.

With reference to FIG. 13, a fourth embodiment of the RF communications system 100d is contemplated. Although the transceiver 106 includes the first operating frequency band transmit port 108, the first operating frequency band primary receive port 110a, the first operating frequency band secondary receive port 110b, the second operating frequency band transmit port 112, the second operating frequency band primary receive port 114a, and the second operating frequency band secondary receive port 114b, the manner in which these ports are connected to the first front end circuit 140 differs. Single operating frequency band transmit and dual operating frequency band receive is possible with this configuration.

The first operating frequency band transmit port 108 is connected to the first operating frequency band transmit band-pass filter 128, while the second operating frequency transmit port 112 is connected to the second operating frequency band transmit band-pass filter 134. These two band-pass filters are connected to the respective H and L ports of a first dual band diplexer 240. The S port of the first dual band diplexer 240 is connected to a throw of the switch SW1. The other throw of the switch SW1 is connected to an S port of a second dual band diplexer 242, with the H port being connected to the first operating frequency band primary receive port 110a, and the L port being connected to the second operating frequency band primary receive port 114a. Thus, the switch SW1 selects between either of the two transmit ports, or either of the two receive ports of the transceiver 106. In addition to the RF signals transmitted and received by the transceiver 106, the bias supply voltage 204 is coupled to the first interconnect cable 132.

The transmit-receive module 127 is connected to the first interconnect cable 132, as well as the first antenna cable 120 that links the transmit-receive module 127 to the first antenna 116. In further detail, the transmit-receive module 127 includes the front end circuit 220, and one the three embodiments of the front end circuit 220c-e that contemplates the single transmit-receive port 238 may be utilized. The front end circuit 220 has a first operating frequency band power amplifier 246, a first operating frequency band low noise amplifier 248, a second operating frequency band low noise amplifier 250, and a second operating frequency band power amplifier 252. The input of the first operating frequency band low noise amplifier 248 is selectively connected to the transmit-receive port 238 via a second switch SW2. Similarly, the input of the second operating frequency band low noise amplifier 252 is selectively connected to the transmit-receive port 238 via a fifth switch SW5. The output of the first operating frequency band low noise amplifier 248 is selectively connected to the transmit-receive port 238 via a third switch SW3, while the output of the second operating frequency band low noise amplifier 250 is selectively coupled to the transmit-receive port 238 via a fourth switch SW4. Generally, these switches are understood to correspond to the switching transistors Q13, Q16, Q14, and Q15, respectively, along with the associated control circuits and decoupling capacitors in the aforementioned front end circuit 220c.

Similarly, the output of the first operating frequency band low noise amplifier 248 is selectively connected to a common junction 254 via a sixth switch SW6. The output of the second operating frequency band low noise amplifier 252 is selectively connected to the common junction 254 via a ninth switch SW9. The input of the first operating frequency band low noise amplifier 248 is selectively connected to the common junction 254 via a seventh switch SW7. The input of the second operating frequency band low noise amplifier 250 is selectively coupled to common junction 254 via an eighth switch SW8.

The common junction 254 is tied to a combined operating frequency band third order harmonics filter 256. The first operating frequency power amplifier 246, however, is separately connected to a first operating frequency band second order harmonics filter 258. The second operating frequency band power amplifier 252 is likewise connected to a separate second operating frequency band second order harmonics filter 172. The combined operating frequency band third order harmonics filter 256 is connected to the antenna port 224, to which the first antenna cable 120 and the first antenna 116 are connected.

Control of the front end circuit 220 is possible via a differently configured set of control lines 260, which includes a operating frequency band selection line 260a, a transmit/receive function selection line 260b, and a transmit power detector output line 260c. The bias supply voltage 204 is connected over the signal transmission line of the interconnect cable 132 in the manner described above.

The secondary receive ports, that is, the first operating frequency band secondary receive port 110b and the second operating frequency band secondary receive port 114b, are connected to the H port and the L port of a third dual band diplexer 244, respectively. A conventional cable 246, with its attendant signal losses, connects the S port of the third dual band diplexer 244 to the second antenna 118. Because of the losses associated with this conventional connection to the second antenna 118, it is understood that throughput and/or link distance may be slightly reduced. The following fifth embodiment of the RF communications system 100e may resolve this, however.

Figure 14:
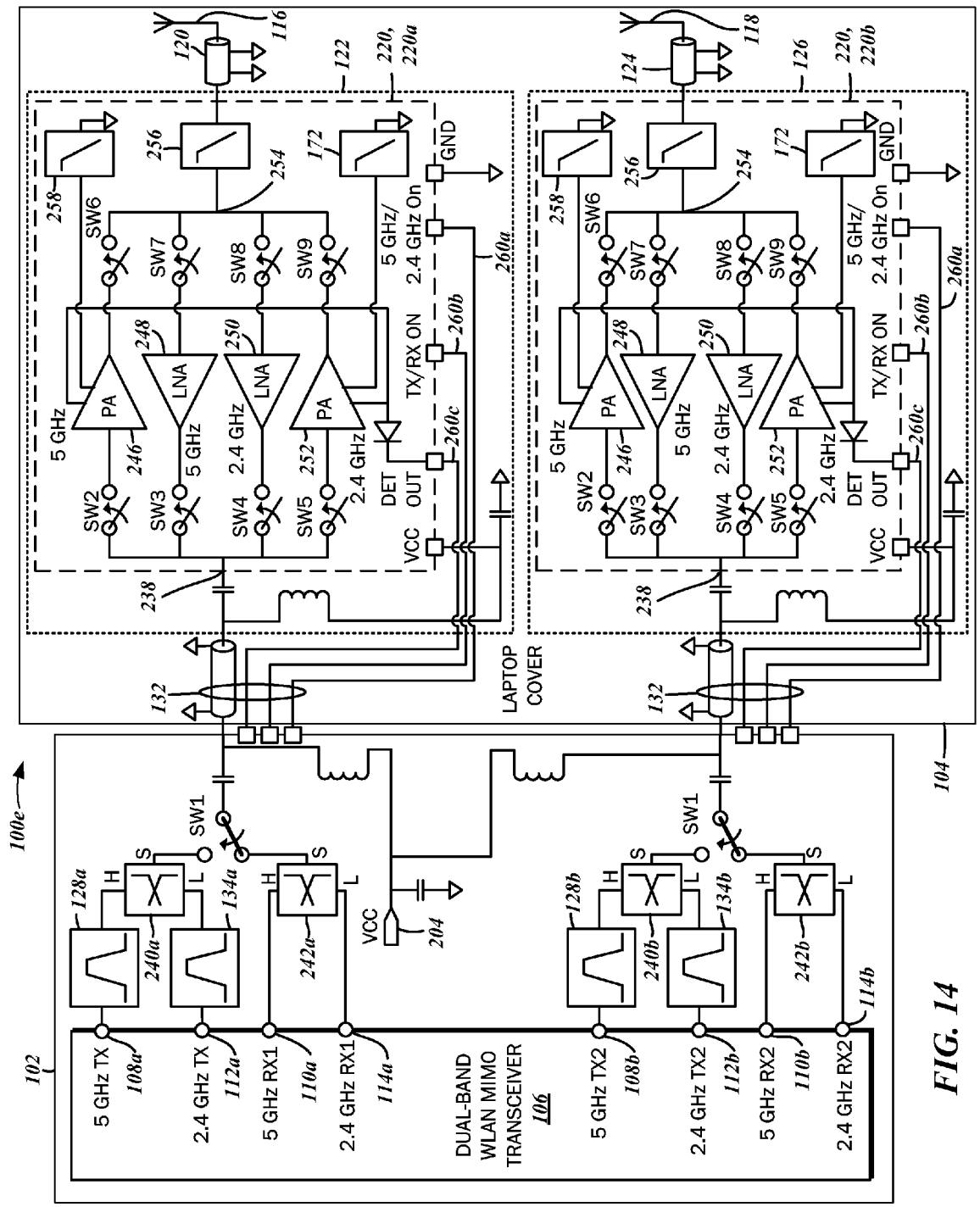
FIG. 14 is a block diagram of a fifth embodiment of the RF communications system with the first front end circuit and a second front end circuit as shown in FIGS. 10, 11, and 12.

With reference to the block diagram of FIG. 14, the fifth embodiment 100e utilizes the transceiver 106 with additional first and second operating frequency band transmit ports, thus enabling true dual band transmit/dual band receive functionality. This configuration is contemplated to increase link distanced by over a factor of four. In further detail, the transceiver 106 includes a first operating frequency band primary transmit port 108*a*, as well as a first operating frequency band secondary transit port 108*b*. There is also a second operating frequency band primary transmit port 112*a*, and a second operating frequency band secondary transmit port 112*b*.

Generally, the primary transmit and receive ports are connected to the first transmit-receive module 122 with the front end circuit 220, also referenced as a first embodiment of the front end circuit 220*a*, and the secondary transmit and receive ports are connected to the second transmit-receive module 126 with a second embodiment of the front end circuit 220*b*. It is contemplated that the second embodiment of the front end circuit 220*b* is configured identically to the first embodiment of the front end circuit 220*a*. Additionally, the band pass filters 128, 134, as well as the configuration of the diplexers 240, 242 for the primary transmit and receive ports are duplicated for the secondary transmit receive ports.

In accordance with the various embodiments of the RF communications system 100 and the front end circuits 220 discussed herein, substantial performance improvements in wireless LAN applications are contemplated. Specifically, sensitivity is enhanced, and link distances can be increased. With a proper placement of the front end circuit 220 close to the antennas 116, 118, a single die implementation thereof can be a drop-in replacement in existing wireless LAN architectures.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention with more particularity than is necessary for the fundamental understanding of the present invention, the description taken with the drawings making apparent to those skilled in the art how the several forms of the present invention may be embodied in practice.

What is claimed is:

1. A radio frequency (RF) communications system with a first operating frequency band and a second operating frequency band, the system comprising:
    a first antenna;
    a second antenna;
    a transceiver with a first operating frequency band transmission port, a second operating frequency band transmission port, a first operating frequency band primary reception port, a second operating frequency band secondary reception port, a second operating frequency band primary reception port, and a second operating frequency band secondary reception port;
    a first front end circuit including a first operating frequency band low noise amplifier, a second operating frequency band low noise amplifier, and a first operating frequency band power amplifier, the first front end circuit being connected to the first antenna;
    a second front end circuit including a first operating frequency band low noise amplifier, a second operating frequency band low noise amplifier, and a second operating frequency band power amplifier, the second front end circuit being connected to the second antenna;
    a first switching circuit selectively connecting the first operating frequency band transmission port, the first operating frequency band primary reception port, and the second operating frequency band secondary reception port to the first front end circuit; and
    a second switching circuit selectively connecting the second operating frequency band transmission port, the first operating frequency band secondary reception port, and the second operating frequency band primary reception port to the second front end circuit;
    wherein the first antenna and the second antenna are distant from the transceiver, the first and second front end circuit are proximal to the respective one of the first and second antenna, and the first and second switching circuits are proximal to the transceiver.

2. The RF communications system of claim 1, wherein the front end circuits and the switching circuits have a transmit mode, a first receive mode, and a second receive mode.

3. The RF communications system of claim 2, wherein in the transmit mode a first transmit signal of the first operating frequency band generated on the first operating frequency band transmission port is passed to the first antenna, and a second transmit signal of the second operating frequency band generated on the second operating frequency band transmission port is passed to the second antenna.

4. The RF communications system of claim 2, wherein in the first receive mode, a first receive signal on the first antenna is passed to the first operating frequency band primary reception port, and a second receive signal on the second antenna is passed to the first operating frequency band secondary reception port.

5. The RF communications system of claim 2, wherein in the second receive mode, a first receive signal on the first antenna is passed to the second operating frequency band secondary reception port, and a second receive signal on the second antenna is passed to the second operating frequency band primary reception port.

6. The RF communications system of claim 2, wherein the transmit mode and the first receive mode are concurrently activated.

7. The RF communications system of claim 2, wherein the transmit mode and the second receive mode are concurrently activated.

8. The RF communications system of claim 2, wherein the first receive mode and the second receive mode are concurrently activated.

9. The RF communications system of claim 1, further comprising:
    a first operating frequency band harmonics filter interconnected between the first antenna and the first front end circuit for filtering out the second harmonic frequencies and third harmonic frequencies of the first operating frequency in a transmit mode.

10. The RF communications system of claim 1, further comprising:
    a second operating frequency band harmonics filter interconnected between the second antenna and the second front end circuit for filtering out the third harmonic frequencies of the second operating frequency in a transmit mode.

11. The RF communications system of claim 1, further comprising:
    a second operating frequency band harmonics filter coupled to the second operating frequency band power amplifier for filtering out the second harmonic frequencies of the second operating frequency in a transmit mode.

12. The RF communications system of claim 1, wherein:
    the first front end circuit further includes a combined first and second operating frequency band low noise amplifier, with the corresponding first operating frequency band low noise amplifier and the second operating frequency band low noise amplifier connected thereto; and the second front end circuit further includes a combined first and second operating frequency band low noise amplifier, with the corresponding first operating frequency band low noise amplifier and the second operating frequency band low noise amplifier connected thereto.

13. The RF communications system of claim 1, wherein:
the first switching circuit selectively interconnects the first front end circuit to a first bandpass filter for the first operating frequency band transmission port and a first diplexer connected to the first operating frequency band primary reception port and the second operating frequency band secondary reception port; and the second switching circuit selectively interconnects the second front end circuit to a second bandpass filter for the first operating frequency band transmission port and a second diplexer connected to the first operating frequency band secondary reception port and the second operating frequency band primary reception port.

14. The RF communications system of claim 1, further comprising:
a first transmit power level detector circuit connected to the first operating frequency band power amplifier and the transceiver; and
a second transmit power level detector circuit connected to the second operating frequency band power amplifier and the transceiver.

15. The RF communications system of claim 1, further comprising:
a first cable connecting the first switching circuit to the first front end circuit, the first cable including a first set of controls lines from the transceiver;
a second cable connecting the second switching circuit to the second front end circuit, the second cable including a second set of control lines from the transceiver.

16. The RF communications system of claim 14, wherein the first set of control lines of the first cable is connected to the first front end circuit, and the second set of control lines of the second cable is connected to the second front end circuit.

17. The RF communications system of claim 15, wherein a subset of the first set of control lines of the first cable is connected to the first front end circuit and the second front end circuit, and a subset of the second set of control lines of the second cable is connected to the first front end circuit and the second front end circuit.

18. The RF communications system of claim 15, wherein power is supplied to the first and second front end circuits through a one of the first cable and the second cable.

19. The RF communications system of claim 18, wherein the one of the cables includes:
a coaxial center conductor;
a coaxial outer conductor substantially encompassing the coaxial center conductor;
one or more electrically isolated control line carrier conductors extending along an outer periphery of the coaxial outer conductor; and
a common envelope covering the coaxial outer conductor and the one or more control line carrier conductors.

20. The RF communications system of claim 19, wherein the bias supply voltage and RF signals to and from the respective one of the first and second front end circuits is carried in the coaxial center conductor.

21. The RF communications system of claim 1, wherein:
the RF transceiver is compliant with the IEEE 802.11 wireless local area network standard;
the first operating frequency band is 2.4 GHz; and
the second operating frequency band is 5 GHz.

22. The RF communications system of claim 1, wherein:
the first antenna and the second antenna are attached to a cover of a laptop computer; and
the transceiver is fixed to a main board of the laptop computer separate from the cover thereof.

23. A radio frequency (RF) communications system with a first operating frequency band and a second operating frequency band, the system comprising:
a first antenna;
a second antenna;
a transceiver with a first operating frequency band primary transmission port, a second operating frequency band primary transmission port, a first operating frequency band primary reception port, and a second operating frequency band primary reception port;
a first front end circuit with a first port coupled to the first antenna and a second port coupled to the transceiver, the first front end circuit including a first operating frequency band low noise amplifier, a second operating frequency band low noise amplifier, a first operating frequency band power amplifier, and a second operating frequency band power amplifier;
a first switching circuit selectively connecting the first operating frequency band primary transmission port, the first operating frequency band primary reception port, the second operating frequency band primary transmission port, and the second operating frequency band secondary reception port to the second port of the first front end circuit; and
wherein the first antenna and the second antenna are distant from the transceiver, the first front end circuit is proximal to the first and second antenna, and the first switching circuit is proximal to the transceiver.

24. The RF communications system of claim 23, wherein the first switching circuit selectively interconnects the second port of the first front end circuit to a first diplexer connected to the first operating frequency band primary transmission port and the second operating frequency band primary transmission port, and a second diplexer connected to the first operating frequency band primary reception port and the second operating frequency band primary reception port.

25. The RF communications system of claim 23, further comprising:
a first transmit power level detector circuit connected to the first operating frequency band power amplifier of the first front end circuit, the second operating frequency band power amplifier of the first front end circuit, and the transceiver.

26. The RF communications system of claim 23, wherein the first front end circuit further includes:
a first bank of switches each selectively connecting to the first port of the first front end circuit, an output of the first operating frequency band power amplifier, an output of the second operating frequency band power amplifier, an input of the first operating frequency band low noise amplifier, and an input of the second operating frequency band low noise amplifier.

27. The RF communications system of claim 23, wherein the first front end circuit further includes:
a second bank of switches each selectively connecting to the second port of the first front end circuit, an input of the first operating frequency band power amplifier, an input of the second operating frequency band power amplifier, an output of the first operating frequency band low noise amplifier, and an output of the second operating frequency band low noise amplifier.

28. The RF communications system of claim 23, further comprising:
a combined first operating frequency band and second operating frequency band harmonics filter interconnected between the first antenna and the first front end circuit.

29. The RF communications system of claim 23, further comprising:
a second operating frequency band harmonics filter coupled to the second operating frequency band power amplifier for filtering out the second harmonic frequencies of the second operating frequency in a transmit mode.

30. The RF communications system of claim 23, further comprising:
a first operating frequency band harmonics filter interconnected between the first antenna and the first front end circuit for filtering out the second harmonic frequencies of the first operating frequency in a transmit mode.

31. The RF communications system of claim 23, wherein the transceiver further includes a first operating frequency band secondary reception port and a second operating frequency band secondary reception port.

32. The RF communications system of claim 31, further comprising:
a first diplexer connecting the second antenna to the first operating frequency band secondary reception port and the second operating frequency band secondary reception port.

33. The RF communications system of claim 31 wherein the transceiver further includes a first operating frequency band secondary transmission port and a second operating frequency band secondary transmission port.

34. The RF communications system of claim 33, further comprising:
a second front end circuit with a first port coupled the second antenna and a second port coupled to the transceiver, the second front end circuit including a first operating frequency band low noise amplifier, a second operating frequency band low noise amplifier, a first operating frequency band power amplifier, and a second operating frequency band power amplifier; and
a second switching circuit selectively connecting the first operating frequency band secondary transmission port, the first operating frequency band secondary reception port, the second operating frequency band second transmission port, and the second operating frequency band secondary reception port to the second port of the second front end circuit.

35. The RF communications system of claim 34, wherein the second switching circuit selectively interconnects the second port of the second front end circuit to a third diplexer connected to the first operating frequency band secondary transmission port and the second operating frequency band secondary transmission port, and a fourth diplexer connected to the first operating frequency band secondary reception port and the second operating frequency band secondary reception port.

36. The RF communications system of claim 23, wherein:
the RF transceiver is compliant with the Institute of Electrical and Electronics Engineers (IEEE) 802.11 wireless local area network standard; and
the first operating frequency band is 2.4 GHz; and
the second operating frequency band is 5 GHz.

37. The RF communications system of claim 23, wherein:
the first antenna and the second antenna are attached to a cover of a laptop computer; and
the transceiver is fixed to a main board of the laptop computer separate from the cover thereof.

38. An RF front end circuit for coupling a transceiver with a first operating frequency band and a second operating frequency band to an antenna, the front end circuit comprising:
an antenna port;
a first operating frequency band transmission port;
a second operating frequency band transmission port;
a first operating frequency band reception port;
a second operating frequency band reception port;
a first operating frequency band transmit-receive block including:
a first operating frequency band power amplifier coupled to the first operating frequency band transmission port; and
a first operating frequency band low noise amplifier coupled to the first operating frequency band reception port;
a first operating frequency band switching network connected to the first operating frequency band power amplifier and the first operating frequency band low noise amplifier, the first operating frequency band switching network including at least one resonant circuit defining a parallel resonance with a resonant resistance in an activated state;
a second operating frequency band transmit-receive block including:
a second operating frequency band power amplifier coupled to the second operating frequency band transmission port;
a second operating frequency band low noise amplifier coupled to the second operating frequency band reception port; and
a second operating frequency band switching network connected to the second operating frequency band power amplifier and the second operating frequency band low noise amplifier, the second operating frequency band switching network including a resonant circuit defining a parallel resonance with a resonant resistance in an activated state;
wherein the first operating frequency band switching network and the second operating frequency band matching network are connected to the antenna port.

39. The front end circuit of claim 38, wherein the first operating frequency band transmission port, a second operating frequency band transmission port, a first operating frequency band reception port, a second operating frequency band reception port are common as a combined first and second operating frequency band transmit and reception port.

40. The front end circuit of claim 39, further comprising:
at least one switching transistor circuit coupled to at least one of the first operating frequency band transmission port, the second operating frequency band transmission port, the first operating frequency band reception port.

41. The front end circuit of claim 39, wherein a first stage of the first operating frequency band low noise amplifier and a first stage of the second operating frequency band low noise amplifier are independent.

42. The front end circuit of claim 41, wherein a second stage of the first operating frequency band low noise amplifier and a second stage of the second operating frequency band low noise amplifier are independent.

43. The front end circuit of claim 41, wherein a second stage of the first operating frequency band low noise amplifier and a second stage of the second operating frequency band low noise amplifier share a common cascode transistor stage.

44. The front end circuit of claim 39, further comprising:
a switching transistor circuit coupled to an input of the first operating frequency band power amplifier and an input of the second operating frequency band power amplifier.

45. The front end circuit of claim 44, wherein the switching transistor circuit includes:
- a common transistor stage coupled to the combined first and second operating frequency band transmit reception port;
- a first cascode transistor stage coupled to the first operating frequency band power amplifier and the common transistor stage; and
- a second cascode stage coupled to the second operating frequency band power amplifier and the common transistor stage.

* * * * *